United States Patent
Lambert et al.

(10) Patent No.: US 7,915,438 B1
(45) Date of Patent: Mar. 29, 2011

(54) SOLID PHASE HOST COMPOSITIONS

(75) Inventors: Joseph B. Lambert, Glenview, IL (US); Chunqing Liu, Evanston, IL (US)

(73) Assignee: Northwestern University, Evanston, IL (US)

( * ) Notice: Subject to any disclaimer, the term of this patent is extended or adjusted under 35 U.S.C. 154(b) by 776 days.

(21) Appl. No.: 11/901,809

(22) Filed: Sep. 18, 2007

Related U.S. Application Data

(62) Division of application No. 10/430,702, filed on May 6, 2003, now Pat. No. 7,271,259.

(60) Provisional application No. 60/378,335, filed on May 6, 2002.

(51) Int. Cl.
*C07F 7/08* (2006.01)
*C07F 7/12* (2006.01)
*C07F 7/18* (2006.01)

(52) U.S. Cl. ......... 556/443; 556/449; 556/450; 556/465

(58) Field of Classification Search ............... 556/443, 556/449, 450, 465
See application file for complete search history.

(56) References Cited

U.S. PATENT DOCUMENTS

| 5,268,442 A | 12/1993 | Bradshaw et al. |
| 5,403,898 A | 4/1995 | Bradshaw et al. |

OTHER PUBLICATIONS

Kimura et al. {Bull. Chem. Soc. Jpn., 71 (1998), pp. 657-660.}.*
Narumi et al. {Tetrahedron Letters, 43 (2002), pp. 621-625)}.*
Lambert, J.B., Liu, C., Boyne, M.T., Zhang, A.P., and Yin, Y., Solid Phase Host—Guest Properties of Cyclodextrins and Calixarenes Covalently Attached to a Polysilsesquioxane Matrix, Chem. Mater. 2003, 15, pp. 131-145.
Huq, R., Mercier, L., and Kooyman, P.J., Incorporation of Cyclodextrin into Mesostructured Silica, Chem. Mater, 2001, 13, pp. 4512-4519.
Mayr, B., Sinner, F., Buchmeiser, M.R., Chiral β-Cyclodextrin-Based Polymer Supports Prepared via Ring-Opening Metathesis Graft-Polymerization, J. Chromatoophy A, 907 (2001) 47-56.
Ciucanu, I.; Selective Immoblization on Silica Gel of Permethylated β-cyclodextrin for Liquid Chromatography, J. Chromatography A (1996) vol. 727 pp. 195-201.

* cited by examiner

*Primary Examiner* — Elvis O Price
(74) *Attorney, Agent, or Firm* — Reinhart Boerner Van Deuren s.c.

(57) ABSTRACT

A new family of silicon-based polymers has been prepared in which organic host components are bound covalently. The polymer is a polysilsesquioxane matrix comprising, for example, hosts such as cyclodextrins (CD) or calixarenes (CX).

10 Claims, 13 Drawing Sheets

(a)

(b)

SOLID PHASE HOST COMPOSITIONS

This application is a divisional of and claims priority benefit from application Ser. No. 10/430,702 filed May 6, 2003, issued as U.S. Pat. No. 7,271,259 on Sep. 18, 2007, and provisional patent application Ser. No. 60/378,335 filed May 6, 2002, each of which is incorporated herein by reference in its entirety.

This invention was made with government support under Grant No. CHE-0091162 awarded by the National Science Foundation. The government has certain rights in the invention.

BACKGROUND OF THE INVENTION

The use of the solid state in synthetic organic chemistry conveys enormous advantages in terms of separation and purification of materials, particularly in multistep syntheses. Starting with the synthesis of polypeptides and continuing with the synthesis of polynucleotides, attachment of substrates to a solid-material has enabled chemists to remove by-products and impurities readily over many high yield steps. The method has become a central feature in the synthesis of organic materials with repetitive units. The solid state also provides unique opportunities to control organic reactions.

Solid inorganic silicates that include clays and zeolites have provided a framework for separations and catalysis utilizing naturally occurring mesoporous cavities. The use of organics as templates has allowed such cavities to be created with designed shapes. Silicate cavities offer acidic and basic sites for interaction with guest molecules. Specially designed organic clathrates also can provide cavities or channels in which guests may reside. The insoluble nature of these mesoporous inorganic and organic hosts permits their use in heterogeneous contexts, whereby purifications (such as removal of water by molecular sieves) can be effected and the host and bound impurity removed by simple filtration.

Well-known organic hosts, in the art, include crown ethers, cyclodextrins, calixarenes, and spherands. These molecules usually are soluble in aqueous or organic solvents and serve as hosts for a wide variety of neutral organics, cations, and anions. Their uses now are legion, including drug delivery, catalysis, and purification. Cyclodextrins (abbreviated herein as CD) are cyclic oligomers of glucose, which possess a hydrophilic exterior and a hydrophobic interior into which a variety of small, usually neutral molecules may be introduced. Calixarenes (abbreviated herein as CX) are cyclic oligomers in which aligned phenols, connected by methylene units, serve to complex metals ions and other cations in particular. These hosts offer cavities on the nanometer scale, generally smaller than the zeolitic cavities. Moreover, in contrast to zeolites, CDs and CXs are usually handled in solution, and the host-guest interactions occur within the single liquid phase.

There are several reports in the prior art of insoluble versions of these organic hosts. Typically, the hosts are incorporated into polymers either by direct synthesis or by coating or grafting the host onto a stationary phase. In particular, CD was connected to urethane polymers to create highly cross-linked, insoluble materials, which they envisaged as useful for environmental separations. CD was also incorporated into prior art mesostructured silica noncovalently by co-condensation. CD units were also attached to insoluble organic polymers to create new drug delivery systems. There also have been several reports of insoluble CXs, immobilized noncovalently on organic supports such as polymer beads.

SUMMARY OF THE INVENTION

Figure 1:
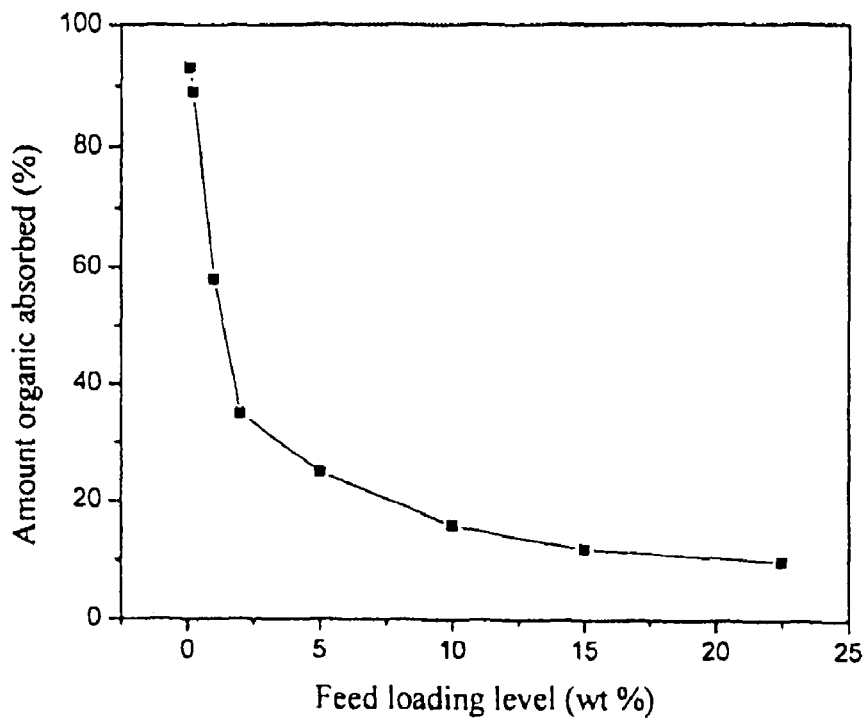
FIG. 1. The effect of loading level of Polymer 1 on the absorption of 4-nitrophenol ($8.63 \times 10^{-5}$ M in water).

This invention relates generally to a new class of insoluble organic host compounds and/or polymer materials. With analogy to solid state synthesis, it is an object of the present invention to provide such compounds and polymeric materials for purification, catalysis, material transport and related such functions.

It is another object of the present invention to provide a range of silylated host components useful for incorporation with or in the preparation of an organo-polysilicate compound, whether amorphous or having an ordered structure, for interaction with a range of charged or neutral guest species.

It is another object of the present invention to provide a variety of polymeric compounds having an ordered, mesoporous structure or matrix to provide or enhance guest accessibility to the microporous or interactive structures provided by the host components/compounds incorporated therewith.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention.

Other objects, features, benefits and advantages of the present invention will be apparent from this summary and its descriptions of various embodiments, and will be readily apparent to those skilled in the art having knowledge of various organic host compounds, their silyl derivatives and synthetic techniques for their incorporation into a polysilicate matrix. Such objects, features, benefits and advantages will be apparent from the above as taken into conjunction with the accompanying examples, data, figures and all reasonable inferences to be drawn therefrom.

I. Sol-Gel Polymeric Compounds and Host Components.

In part, the present invention can include a cyclodextrin host component or compound comprising at least one glucose further comprising a hydrolyzable silyl group pendant therefrom with an ether bond sequence. The silyl group can have at least one hydroxy, halide, alkoxy, or another such hydrolyzable moiety. Without limitation, such a cyclodextrin compound has at least one glucose unit with silyl groups at the 2- and 6-positions thereof. In certain other embodiments, each cyclodextrin glucose unit has a silyl group at the 2- and 6-positions thereof. For purposes of the present compound, compositions and/or associated methods, "pendant" will be understood as having a meaning ascribed thereto by those skilled in the art or as otherwise indicated with respect thereto and means, with regard to a subject group, functionality and/or moiety, such a subject linked, coupled and/or chemically bonded to a second group, functionality and/or moiety. With respect to the present invention, a silyl group such as that described above can be linked, coupled and/or chemically bonded to a cyclodextrin glucose unit by way of an ether bond sequence, the latter a manifestation of the hydroxy functionality of such a glucose unit. While such pendant silyl groups are illustrated by way of the chemical structure resulting from a allylation/hydrosilylation synthetic sequence, various other techniques and procedures for introduction of such silyl groups would be well-known to those skilled in the art. For example, silylation and resulting chemical structure would be limited only by way of available reagents and synthetic technique to provide for incorporation of a cyclodextrin or other such host component into a polymeric compound of the type described herein.

In certain preferred embodiments, such a compound/component is beta-cyclodextrin and the 3-position of any one or each glucose unit can have an OR substituent which can be a hydroxy, allyl, alkoxy, or another hydroxy-derived functional group. Likewise, in such embodiments, one or more glucose units is substituted with at least one silyl group. In various other such embodiments, depending upon intended use or application, each glucose unit is di-substituted; that is, each such glucose unit silyl-substituted at the 2- and 6-positions thereof.

Regardless of any particular host structure and/or glucose substitution, the cyclodextrin components are preferably utilized, in accordance with various polymeric compositions of this invention, with a second such component/compound in siloxane-bonded sequence. Representative cyclodextrin components are illustrated in Scheme 1, the condensation and/or gelation products of which illustrated by the polymeric compounds/compositions of Scheme 3.

In part, the present invention can also include a calixarene host compound or component comprising at least one aryl unit further comprising at least one hydrolyzable silyl group pendant therefrom, meta and/or ortho to a methylene moiety thereof. The silyl group can have at least one hydroxy, halide, alkoxy or another such hydrolyzable moiety. Reference is made to the preceding discussion regarding silyl group(s) pendant from a calixarene aryl unit, such pendancy limited only available reagents and/or synthetic technique used in conjunction therewith, such techniques or modifications thereof as would be understood by those skilled in the art made aware of this invention. In various preferred embodiments, a dimer of two such calixarene components is coupled with a siloxane bond sequence. In certain other embodiments, each aryl unit comprises a pendant silyl group ortho and/or meta to the methylene moiety. A tetrameric calixarene compound/component is preferred, but other calixarenes can be used with good effect depending on end use application.

Regardless of any particular host structure and/or aryl substitution, calixarene host components are preferably utilized, in accordance with various polymeric compositions of this invention, with a second such compound/component in siloxane-bonded sequence. Representative calixarene components are illustrated in Scheme 2, with the corresponding condensation and/or gelation products illustrated as shown by the polymeric compositions of Scheme 4.

With reference to one or more of the aforementioned components, the present invention can also embody an organosilicate polymeric compound including a polysilsesquioxane matrix, and a plurality of cyclic and/or oligomeric organic host components coupled one to another with a siloxane bond sequence. In preferred embodiments, such a host component is a cyclodextrin, a calixarene, or a combination thereof. It will be understood, however, by those skilled in the art made aware of this invention, that various other oligomers can be used, consistent with the broader aspects of this invention and as contemplated herein to provide other host components and the corresponding polymeric matrix compounds for interaction with a variety of charged or neutral guest molecules. Other organic components that can serve as hosts for other neutral organic molecules, for cations, or for anions, include other cyclodextrins, other calixarenes, crown ethers, lariat ethers, podands, cryptands, spherands, cyclophanes, carcerands, hemicarcerands, cavitands, molecular tweezers, molecular clefts, and other organic materials that utilize hydrogen bonding, electrostatic, and other noncovalent interactions to sequester molecules and ions, such components modified as described herein or as would otherwise be known in the art, through straight-forward synthetic techniques, for inclusion with the polymeric compositions of this invention. For example, it would be understood by those skilled in the art and made aware of this invention that various crown ethers can be prepared or synthetically modified for further alteration and/or inclusion of one or more pendant silyl groups, such groups as could be further utilized in conjunction with a siloxane bond sequence as part of a silicate matrix. Representative polymeric compounds are illustrated in aforementioned Schemes 3 and 4. A representative number of co-polymeric compounds are illustrated in Scheme 5.

Accordingly, the present invention can also include one or more methods of using an organic host component in the preparation of a siloxane-bonded solid phase matrix composition. Such a method can include (1) providing one or more organic host components, including but not limited to those described above; (2) modifying each such host component to include at least one silyl functional group; and (3) preparing a siloxane-bonded matrix by condensing a plurality of the modified components. As described elsewhere herein, such methods and related synthetic procedures can be conducted in a suitable liquid medium. The modified host components can be isolated and/or condensed to an extent dependent upon the degree of silyl modification. Upon gelation, the solvent or liquid medium can be removed to provide the solid polymeric matrix composition.

Compositions of the sort described above can be used to selectively interact with a variety of molecular components introduced thereto, such interactions as could be used to facilitate any one of a number of purification, catalytic or material transport functions, as would be understood by those skilled in the art made aware of this invention. As such, the present invention also contemplates a corresponding variety of composites/materials of such matrix compositions and the molecular components interacted therewith.

Whereas past approaches have embedded organic hosts in organic polymers, the present approach can be viewed as a departure from the prior art by attaching the hosts covalently to modified silicate matrices. In contrast to inorganic silicates, in which each silicon is bonded to four oxygens, and to silicones, in which silicon generally is bonded to two oxygens and two organic groups, the silicate matrices and/or silsesquioxanes of this invention contain silicon bonded to three oxygens and one organic group. The overall matrix is silicate like, but the presence of a Si—C bond allows a variety of organic functionalities to be attached, with control of chemical and physical properties including porosity, thermal stability, hydrophobicity, dielectric properties, optics, and chemical sensitivity.

As demonstrated below, this invention includes the synthesis, characterization, and host-guest properties of a new class of compositions that combines the separation properties of silica gel with the host properties of CDs and CXs. Such materials are superior to silica gel because they may be synthetically modified, and they differ from most CD and CX hosts by being entirely insoluble in organic and aqueous media, thereby permitting facile separations.

Hosts from the cyclodextrin (CD) and calixarene (CX) families may be bound covalently to, in certain embodiments, trialkoxysilanes, which may be hydrolyzed and condensed by a sol-gel process into polymers that physically resemble silica gel. These gel polymers formed in high yield usually in minutes. NMR spectra indicated that the CD or CX units were still intact. Tests at high and low pH demonstrated the stability of these materials to hydrolysis. Cyclodextrin provides a nanometer-scale pocket inside the polysilsesquioxane matrix suitable for encapsulation of organics, and calixarene provides a binding site for inorganic cations. The reality of the nanopocket in the CD-based polymers was observed by d spacings of about 9.2 Å in the powder X-ray pattern. SEM and TEM images revealed that the polymers pack in a random network rather than in a well ordered array, and BET measurements indicated relatively low surface area (1.1-1.7 $m^2/g$).

Association experiments with 4-nitrophenol, in which the organic was in aqueous solution and the polymer was present as a solid, resulted in removal of >90% of the organic from solution by the CD-based polymers. The association process was examined as a function of amount of polymer, concentration of solute, pH, and time of contact. Once the polymer had been charged with the organic, it could be renewed by treatment with ethanol, which dissolved out the guest. The CD-based polymers were slightly better than activated carbon, in terms of extent of removal of the organic, and considerably better than CD bound to a urethane polymer. Alternatively, the CX-based polymers selectively removed iron cations from aqueous solution, in the presence of numerous other inorganic cations. Hybrid polymers containing both CD and CX components successfully removed both 4-nitrophenol and iron cations.

These polymers have a number of advantages. (1) They are easily prepared in high yield from inexpensive, readily available starting materials. (2) They can be designed to contain a wide variety of organic hosts, prepared according to our synthetic procedure. (3) They remove organics effectively and iron and other metal cations selectively, depending on the nature of the host. (4) They are largely renewable. Our current experiments involve incorporation of other members of the cyclodextrin and calixarene families into the polysilsesquioxane matrix. For example, variation of the size of the cavity through change in the respective number of glucose or phenol units can alter the selectivity of the materials.

Various aspects of this invention can be understood with consideration of such compositions and their preparation. One such strategy to link organic hosts to silsesquioxane frameworks involves covalently attaching an allyl group to the host, hydrosilylating the allyl double bond, and polymerizing the resulting silane by a sol-gel technique. Scheme 1 illustrates a procedure for preparing two silylated CD monomers. These processes began with the commercially available β-cyclodextrin, the toroidal, cyclic heptamer of glucose. Allyl groups were placed on the 2 and 6 positions of all seven glucose units. An objective in having two allyl groups per glucose in certain embodiments is to enable polymer growth from both the upper and lower faces of the CD torus and therefore to provide extensive cross-linking. Two distinct monomer variations can be produced by either methylating the still remaining 3-hydroxy groups or leaving them free in order to modulate hydrogen bonding properties of later polymers. Hydrosilylation of the allyl groups with trialkoxysilanes then produced Monomer 1 (with seven free 3-hydroxy groups per cyclodextrin unit) and Monomer 2 (with the 3 position methylated). It was estimated from the $^1$H NMR spectra that about 90% of the allyl groups had been silylated. Scheme 1 represents the incomplete hydrosilylation process by including both fully silylated glucose units (n/7 or n'/7~0.9) and completely unsilylated glucose units (~0.1). Monosilylated glucose units can be present through control of reaction stoichiometry, but are not shown in Scheme 1 only for simplicity.

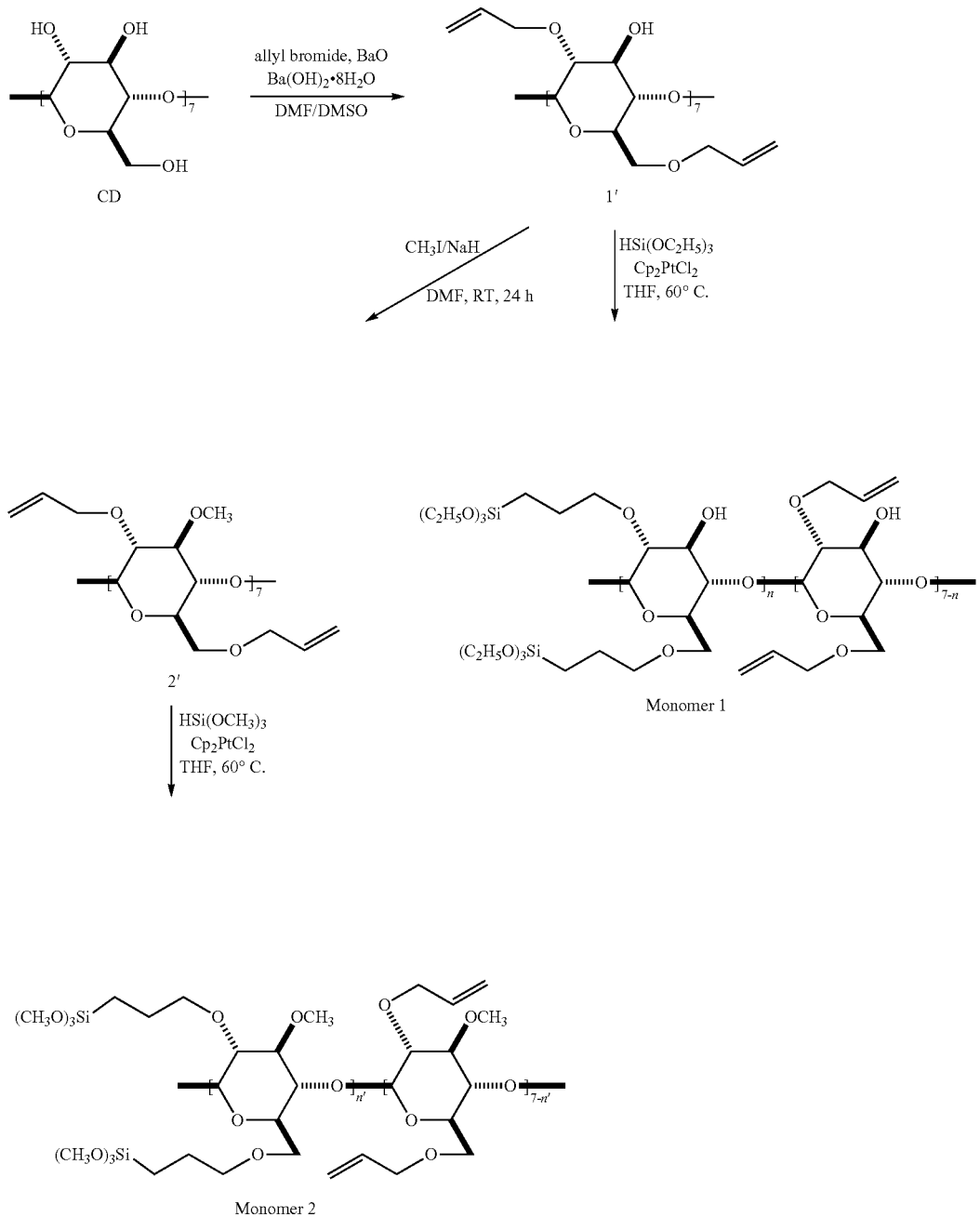

Scheme 2 shows a procedure for preparing silylated CX monomers. The tetrameric calixarene was prepared by literature procedures. The tent-butyl groups were removed from all four phenols, and the phenolic hydroxyls were allylated. Double Claisen rearrangements reconfigured the four allyl groups from the oxygens to the para carbons, as both ortho positions were blocked. The C-allylated phenols then provided a starting point for several CX monomers. The allyl groups may be hydrosilylated directly to give Monomer 3 with free phenolic hydroxyls. The C-allylated system may be O-allylated again and then hydrosilylated to give Monomer 4. Whereas Monomer 3 can polymerize from only one face, Monomer 4 was constructed in order to allow polymerization to take place from both top and bottom faces of the CX. An alternative double CX structure was constructed as follows. The C-allylated phenolic system was dimerized through a silicate linkage by treatment with sodium hydride and tetrachlorosilane, and the dimer was hydrosilylated in the usual fashion to produce Monomer 5. Monomer 3 has four silyl groups per CX, all on a single face, and Monomers 4 and 5 have eight silyl groups per CX, emanating from opposite faces. The silicate linkages in Monomer 5 can be hydrolyzed in a later step to create free hydroxyl groups. The $^1$H NMR spectra indicated that nearly all the allyl groups had been silylated for all three CX monomers.

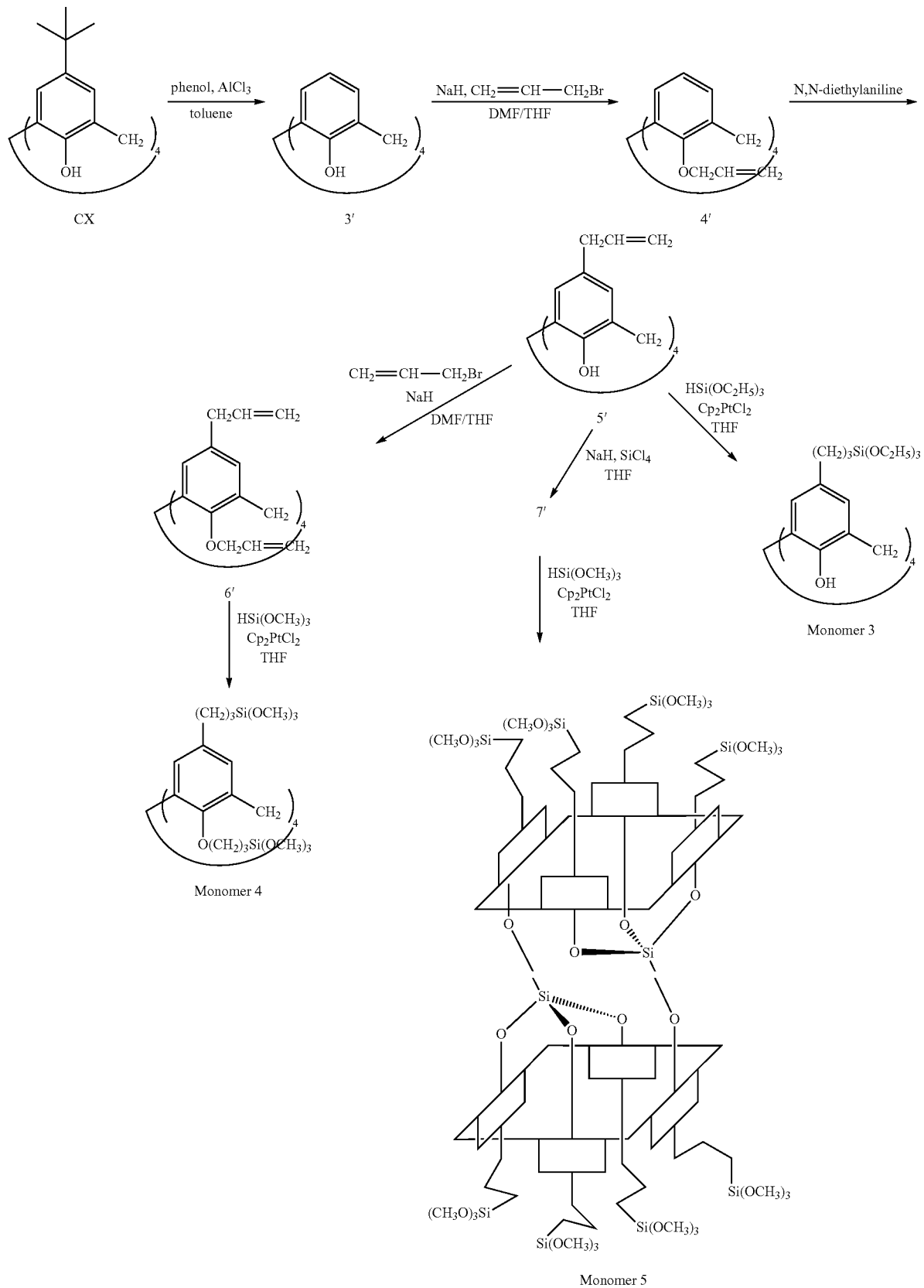

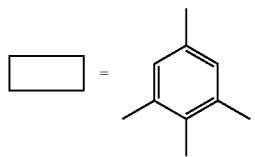 =

Polymerization of these monomers either singly or as mixtures was carried out by the sol-gel method in anhydrous tetrahydrofuran (THF) with aqueous hydrochloric acid as the catalyst. The trialkoxysilyl groups (Si—O—R) are hydrolyzed to generate siloxane (Si—O—Si) bonds via intermediate silanols (Si—O—H). Because each silicon atom offers up to three potential sites of siloxane formation, and each monomer has anywhere from four to fourteen silyl groups, hydrolysis leads to a growing, highly crosslinked polysilsesquioxane polymer. Branching and cross-linking can continue until the network is sufficiently large for the gel transition to occur. The resulting gel then provides a solid polymer network interspersed a liquid medium, such as with solvent (THF), and containing the covalently bound hosts. Removal of the supporting media/solvent collapses the network to afford the host-containing polysilsesquioxane compound.

Processing Monomers 1-5 in this fashion provides Polymers 1-5, respectively (Schemes 3-5). Hybrid polymers containing both CD and CX units can be constructed by polymerizing mixtures of monomers. Polymer 6 (Scheme 5) was constructed from Monomer 1 (with 3-hydroxy groups) and Monomer 3 (with phenolic hydroxy groups). Polymer 7 was constructed from Monomer 2 (with the 3 positions methylated) and Monomer 5 (the dimeric structure). After gelation and isolation of the polymers from Monomer 5 and from the mixture of Monomers 2 and 5, the silicate linkages were hydrolyzed to produce free hydroxyl groups (Schemes 4 and 5).

Scheme 3

Monomer 1 or Monomer 2

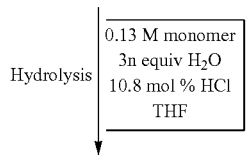

Hydrolysis | 0.13 M monomer
3n equiv $H_2O$
10.8 mol % HCl
THF

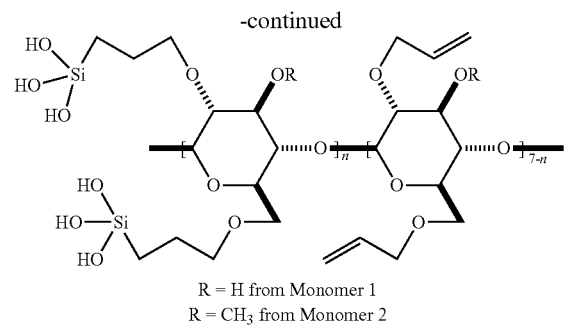

R = H from Monomer 1
R = $CH_3$ from Monomer 2

Condensation
-$H_2O$

Gelation

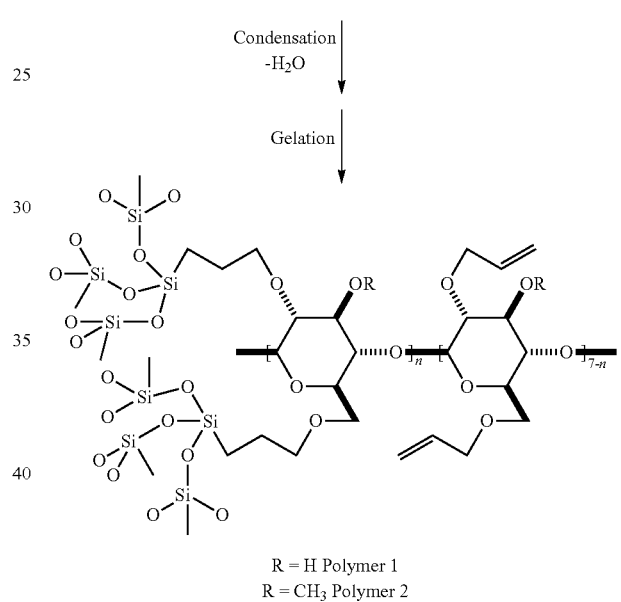

R = H Polymer 1
R = $CH_3$ Polymer 2

Scheme 4

Monomer 3 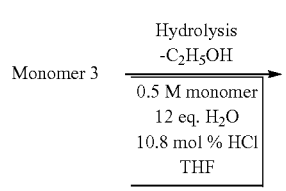 Hydrolysis
-$C_2H_5OH$
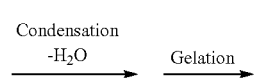
0.5 M monomer
12 eq. $H_2O$
10.8 mol % HCl
THF Condensation
-$H_2O$ Gelation

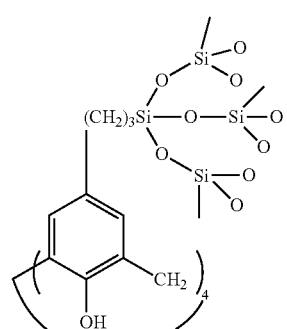

Polymer 3

-continued
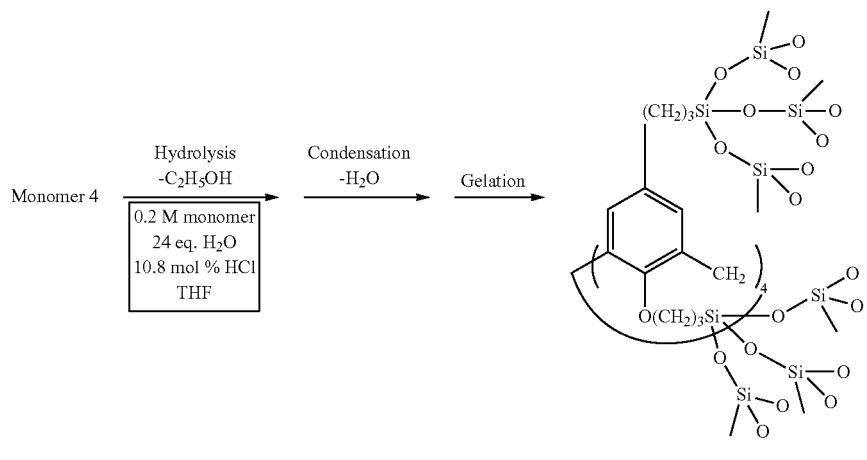
Polymer 4
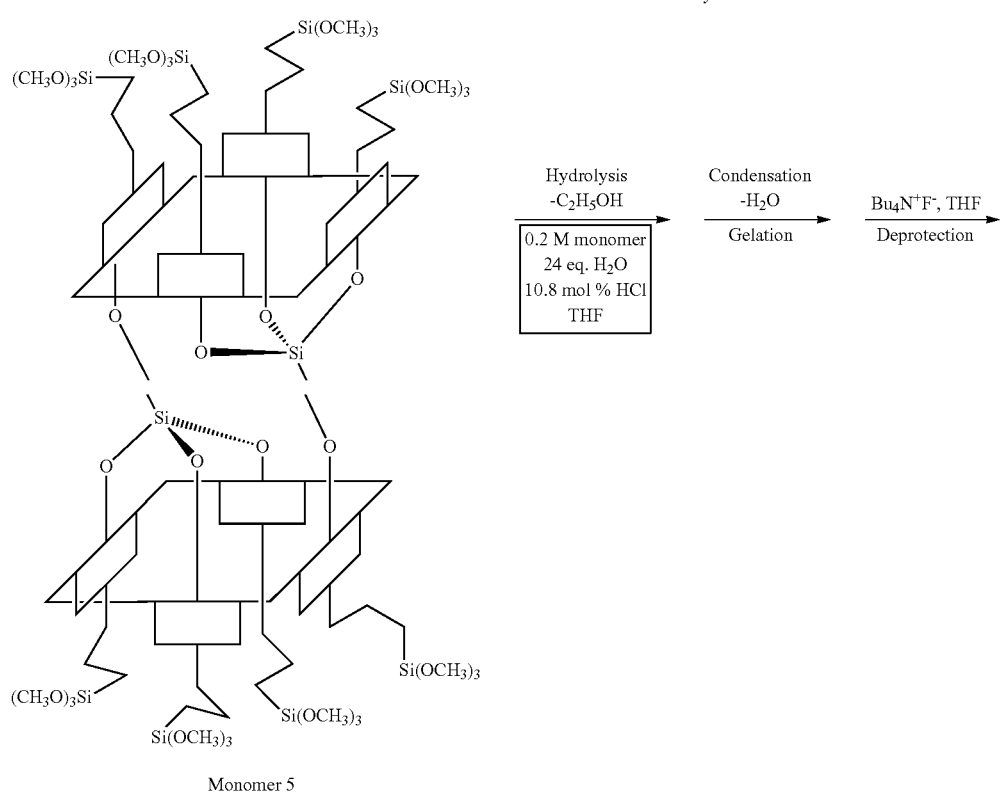
Monomer 5
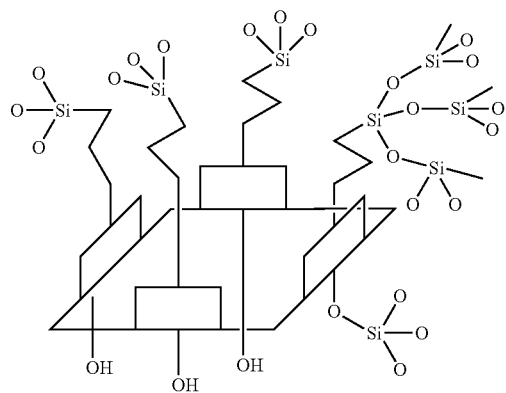

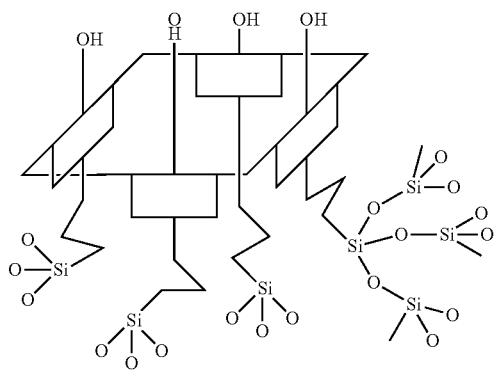
Polymer 5
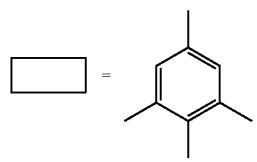 =
Scheme 5
Monomer 2 + Monomer 5 $\xrightarrow[\substack{0.2\text{ M monomer}\\3n+24\text{ eq. }H_2O\\10.8\text{ mol \% HCl}\\THF}]{\substack{\text{Hydrolysis}\\-C_2H_5OH}}$ $\xrightarrow{\substack{\text{Condensation}\\-H_2O}}$ $\xrightarrow{\text{Gelation}}$ $\xrightarrow[\text{Deprotection}]{Bu_4N^+F^-,\text{ THF}}$
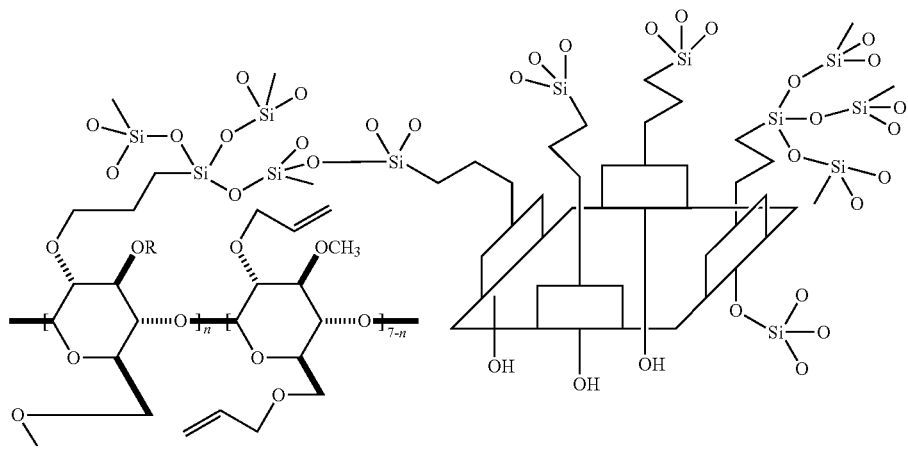

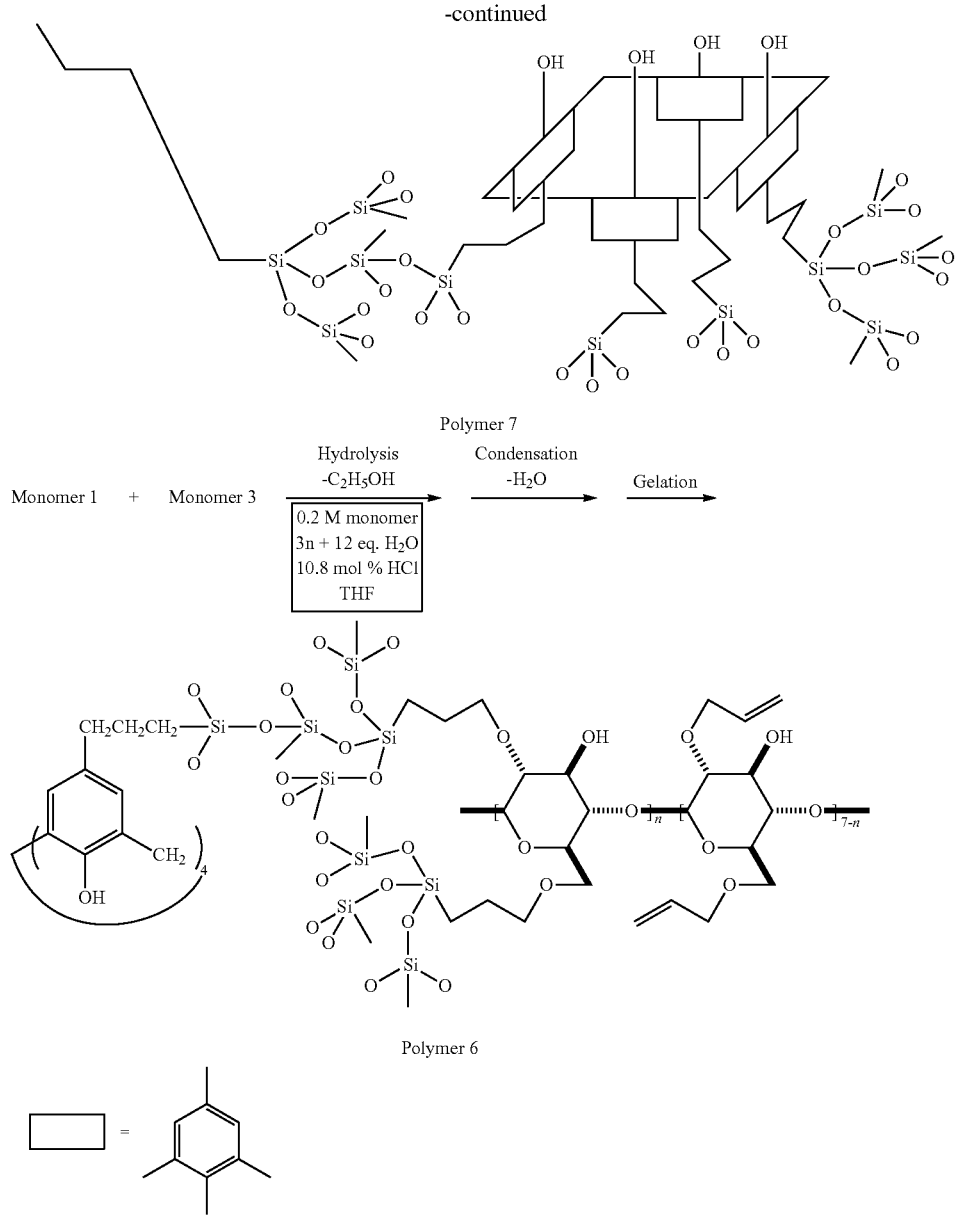

Polymer 7

Polymer 6

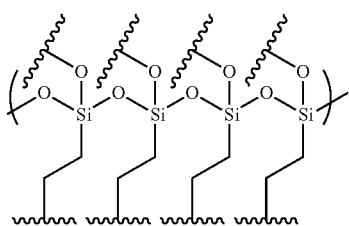

Schemes 3-5 are intended to provide only a representative illustration of the resulting cross-linked polymer structures. For example, in Polymer 1 (Scheme 3), each of the seven glucose units in each CD unit (only one is shown) can possess up to six siloxane connections, for 42 siloxanes per CD. Each of the 42 siloxane oxygens can be attached to another silicon atom (to complete the siloxane unit), and each of these is connected to two more oxygens and one carbon from other CD units. Thus each glucose can be directly attached potentially to 42 other CD units, and through additional siloxane linkages to another 84, for a total of 126 in the next layer of connections. Successive polymerization then multiplies up the factor. If only 90% of the allyl groups had been hydrosilylated and 90% of the silanol units successfully formed siloxane connections, there are still many cross-links per CD. Steric effects would limit realization of all such connections, but clearly a very highly branched, cross-linked structure is obtained. It should be kept in mind that all of the polymers have structures based on the linear form, illustrated below, in which each silyl side chain oxygen is cross-linked to another silyl silicon (notwithstanding the length or attendant functionality of the coupling moiety linking a pendant silyl group to a host component, or possible alternate silylation strategy) to a fully three-dimensional polymer.

Polymers 1 and 2 differ in the presence or absence of the 3-methoxyls. Scheme 4 provides similar schematic representations of the CX polymers. Scheme 5 illustrates the formation of the hybrid Polymers 6 and 7 in which both CD and CX structures are incorporated.

Table 1 contains the gelation times for the sol-gel polymerization of CD and CX monomers, both separately and as mixtures, and for several controls. Methyltrichlorosilane and tetramethoxysilane failed to polymerize to gels either at 1.0 M monomer concentration or concentrations above 5.0 M. In contrast, the CD- and CX-containing monomers polymerized readily at quite low concentrations. The ability of these monomers to form gels at low monomer concentrations may be related to the greater mass and volume of the host building blocks. Monomer concentration is an important consideration. The CD-based Monomers 1 and 2 formed gels within one minute at concentrations as low as 0.13 M. Monomer 3 failed to gel at this concentration, but did gel within 7 min at 0.5 M. Monomers 4 and 5 and the mixtures of CD and CX monomers formed gels at concentrations as low as 0.2 M. Reference is made to examples 1-42, the data thereof and the tables and figures discussed therein.

II. Periodic Mesoporous Polymeric Compounds.

Surfactant templation has proved to be an effective method in the art for preparing periodic mesoporous materials. By way of reference in 1992, the first such synthetic material, called MCM-41, was reported. The procedure involved polymerization of a tetraalkoxysilane in the presence of a surfactant such as cetyltrimethylammonium bromide (CTAB). In water, the surfactant possesses a highly ordered structure. As the siliceous polymer is formed, it layers over and around the surfactant, retaining the original periodic structure. Calcination or solvent washing can remove the surfactant and leave behind the silica-like polymer containing cavities or mesopores that retain the shape of the absent surfactant. Silica formed from the aqueous polymerization of tetramethoxysilane (TMOS) or tetraethoxysilane (TEOS) alone is irregular and broadly distributed in pore size. Silica formed from the same starting materials templated in the presence of a surfactant that is subsequently removed has a periodic structure with uniform pore sizes in the range from 15 Å to more than 100 Å. The prior art material termed MCM-41, for example, possesses hexagonal symmetry. Variations with cubic symmetry or containing other metals such as titanium also have been prepared.

The purely inorganic materials formed by this procedure of templation and washing or calcination have favorable properties but are synthetically limited. A second generation of materials was produced by surface grafting of organics onto MCM-41 and related templated polymers. Because of the mode of synthesis, the organic portions in general protruded into the pores. Co-polymerization of TEOS or TMOS (silicon attached to four oxygens) with silsesquioxanes (silicon attached to three oxygens and one carbon, as in $(RO)_3SR^1$) in the presence of a surfactant produced MCM-41-related materials in which the organic portions were an integral part of the channel walls. Subsequent removal of the surfactant created a periodic microporous hybrid organosilica polymer. The co-monomer TEOS/TMOS was necessary to provide structural integrity. The organics in these co-polymers do not block the channels, they convey fundamental changes to the nature of polymer, and they may be broadly varied to produce novel polymer properties. In general, the silsesquioxanes used had a bridged structure, $(RO)_3Si$—B—$Si(RO)_3$, in order to create more complex cross linking within the polymer. Numerous bridges (—B—) have been explored in such organosilicas of the prior art, including methylene, ethano, etheno, ethyno, 1,4-phenylenyl, thiopheno, and ferrocenyl bridging groups. Such bridges have not, however, provided nor were designed to provide specific cavities or interactive structures, themselves. Such cavities were restricted to the mesoporous structures abandoned by the surfactant template, and the bridge served only to alter structural properties of the polymer matrix.

However, in distinct contrast thereto, the present invention can also provide incorporated bridges —B— that contain organic hosts of the sort as mentioned above, including cyclodextrins and calixarenes. CO-polymerization of $(RO)_3Si$—B—$Si(OR)_3$ (B can be CD or CX) with a silane such as TEOS in the presence of a surfactant, with subsequent removal of the surfactant provides robust periodic organosilicas both mesoporous (from the cavities created by the removal of the surfactant) and microporous (from the CD or CX hosts in the bridges). The two types of cavities can be viewed as symbiotic, as together they may be superior to either alone. Thus the mesopores may provide greater accessibility to the CD/CX micropores, with the result that the micropores may have improved complexing or extracting abilities in comparison with the polymers prepared without templation.

More generally, scheme 6 provides a diagrammatic description of a synthesis en route to such polymers of this invention.

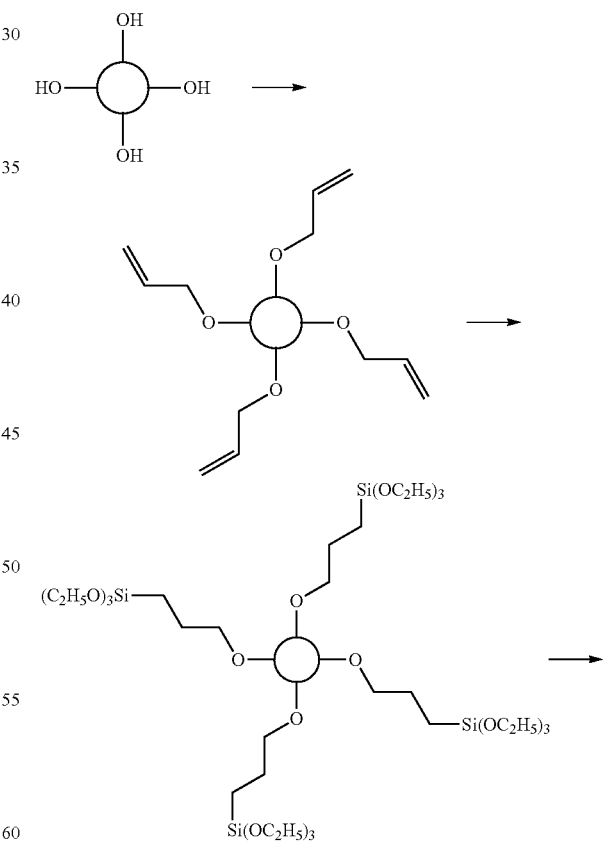

Scheme 6

Polymers

CD or CX rings, for example, can be represented by the circle. In illustrative embodiments, β-cyclodextrin, a cyclic oligosaccharide containing seven glucose molecules with 1,4 connections, and calix[4]arene, in which four phenol units are connected by methylene groups to form a macrocycle can be used. Allyl groups are attached to two hydroxyls in each CD glucose ring (for a total of 14 allyls per CD unit), and allyl groups can be attached to all four para carbons in each CX. Synthetic details for these derivatizations are provided below. By design, each CD unit has seven remaining hydroxyls and each CX has four hydroxyls. The second structure in Scheme 6 represents a product of the first synthetic step, although a CD component/compound would have 14 protruding allyl groups.

All allyl groups can then be hydrosilylated to form the third structure in Scheme 6. The organic portion (circle) in this schematic structure corresponds to bridge component B in the formula $(RO)_3Si$—B—$Si(OR)_3$. A silylated CD can have up to 14 silyl groups (the hydrosilylation yield may not be 100%), and the silylated CX has 4 silyl groups, for subsequent polymerization.

As discussed above, cyclodextrins and calixarenes, which normally are water soluble, can be rendered insoluble when made an integral structural component of these polymers. These hosts offer microporous cavities capable of binding guests such as organic molecules or inorganic cations. These host-containing polymers proved very effective in removing such guests from aqueous solutions. Because of their insolubility, the guest-impregnated materials are separated from the water solution simply by filtration. The CD-containing polymers moreover are insoluble in organic solvents but their organic guests are not. Consequently, the polymers are renewable through washing with organic solvents. The ease of preparation, high stability, favorable binding properties, facile separation, and good renewability suggest a variety of uses in water reclamation, drug delivery, catalysis, and separations.

Figure 8:
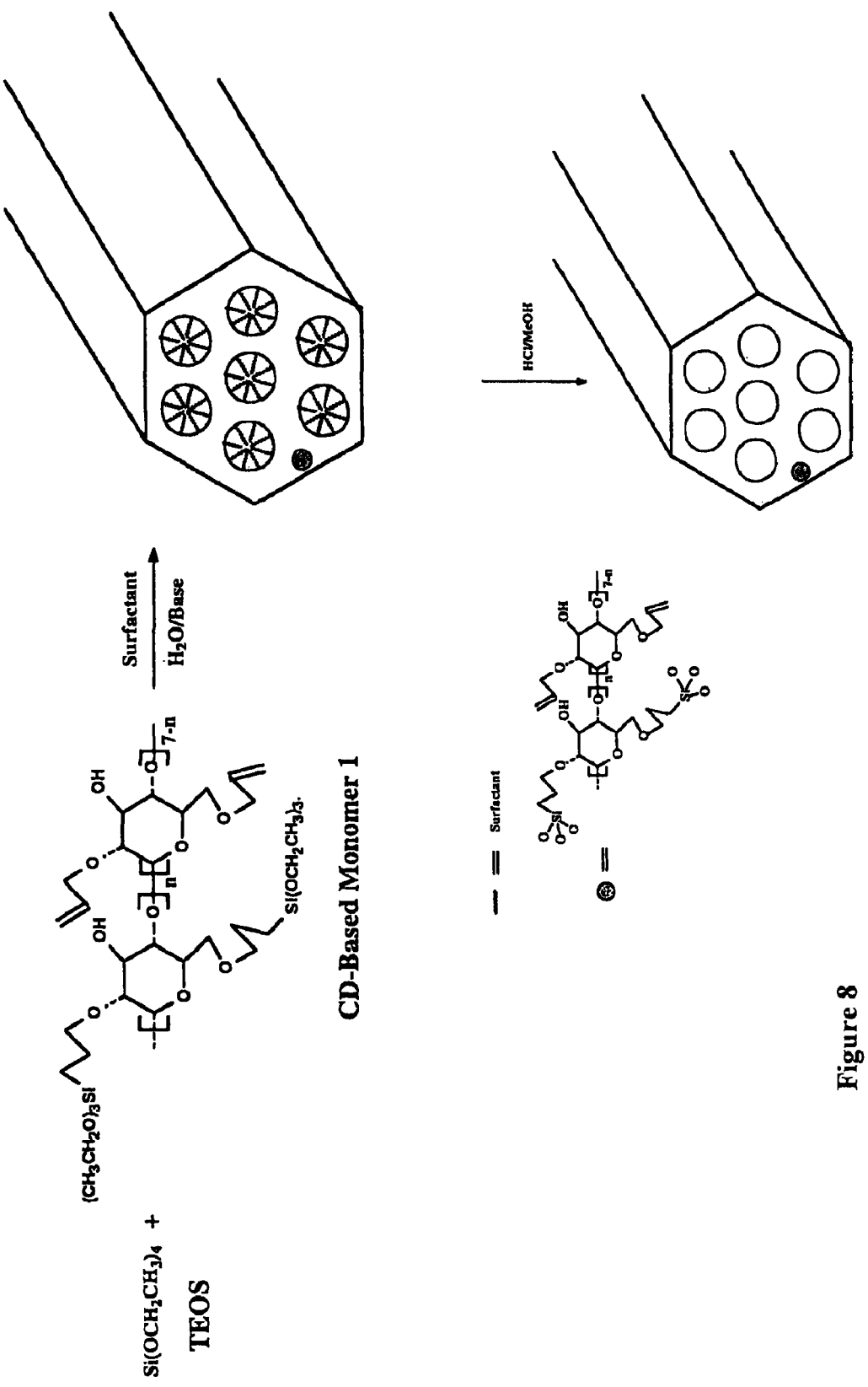
FIG. 8. Synthetic route to ordered CD-based mesoporous organosilicon materials. TEOS/Monomer 1 (in Si molar ratio)=1/0 (1a, 1a'); 0.9/0.1 (1b, 1b'); 0.75/0.25 (1c, 1c'); 0.5/0.5 (1d, 1d'); 0.25/0.75 (1e, 1e'). Note that the schematic figures are not drawn to scale.
Figure 9:
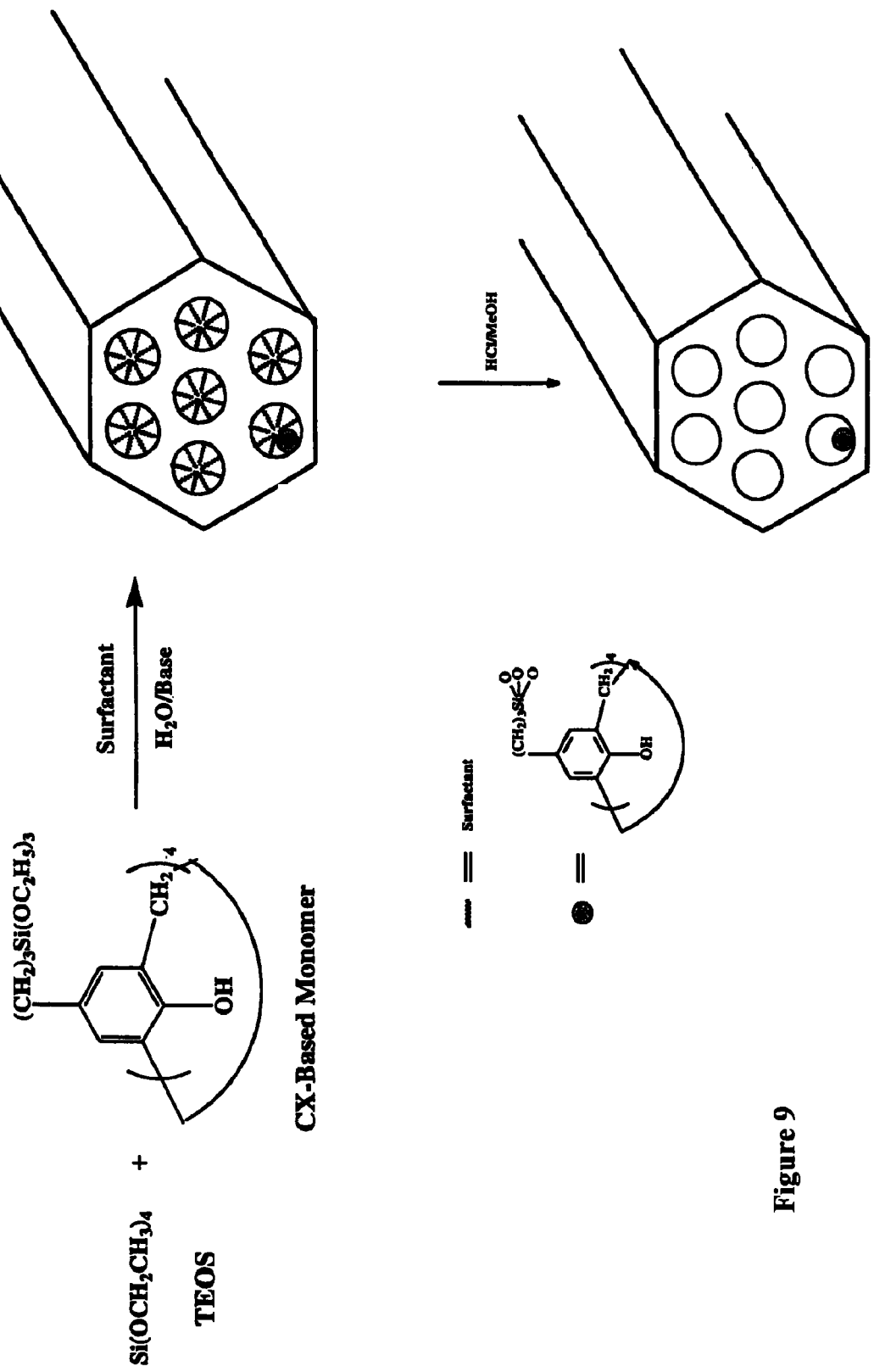
FIG. 9. Synthetic route to ordered CX-based mesoporous organosilicon materials. TEOS/Monomer 3 (in Si molar ratio)=0.9/0.1 (2b, 2b'); 0.75/0.25 (2c, 2c'); 0.5/0.5 (2d, 2d"); 0.25/0.75 (2e, 2e'). Note that the schematic figures are not drawn to scale.

As an extension of such results, templating and extraction procedures can be used to provide periodic mesoporous organosilicas. Monomers 1 and 3 are co-condensed at room temperature with tetraethoxysilane (TEOS) in the present of the surfactant such as cetyltrimethylammonium bromide (CTAB) to produce the as-synthesized polymers. The ratio of TEOS to monomer can be varied to produce a series of polymers in each case. The surfactant can be removed, for example, by treatment with methanol containing aqueous hydrochloric acid to produce the periodic mesoporous organosilicas. FIGS. 8 and 9, respectively illustrate synthetic procedures useful in conjunction herewith. The co-polymeric materials can have somewhat of a hexagonal structure—with CD hosts possibly embedded in the polymer structure and CX hosts possibly protruding into the mesopores—providing improved accessibility of the hosts in comparison with other amorphous, aperiodic materials of this invention. More generally and consistent with the broader aspects hereof, the present invention can also comprise a condensation co-polymer of a silane component and a host component, the co-polymer having the formula $RO_3Si$—B—$Si(OR)_3$, wherein B is a cyclodextrin, a calixarene or a combination thereof, and R is a moiety such that the silyl group can be condensed with the silane component. The resulting co-polymeric compound comprises a porous silicate matrix, and each B component comprises a dimensionally smaller or sub-porous structure or substructure of or within the matrix. As discussed more fully above, a B component can be a cyclodextrin with each $Si(OR)_3$ group pendant therefrom with an ether bond sequence. In certain embodiments, such groups are coupled or bonded to the 2- and 6-positions of a glucose unit. In various other embodiments, an $Si(OR)_3$ group can be at the 2-position of a first glucose unit, while another such group can be at the 6-position of a second glucose unit. As would be understood by those skilled in the art made aware of this invention, the number and positions of such pendant $Si(OR)_3$ groups is limited only by the degree of silylation. Likewise, as discussed more fully above, the B component of such a co-polymer can be a calixarene such that each $Si(OR)_3$ group pendant therefrom is at a position selected from ortho and meta to a methylene moiety of the calixarene component.

As discussed by way of several following examples and figures, the silicate matrix of such a co-polymeric compound is mesoporous, and the B component comprises a microporous structure of or within such a matrix. According to the International Union of Pure and Applied Chemistry (IUPAC), mesopores can be defined as having widths in the range of 2 nm to 50 nm. By comparison, pores having widths less than 2 nm can be defined as micropores. Such a co-polymer is the extraction product of a surfactant template and a suitable solvent, the mesoporosity of the co-polymer imparted by such a surfactant present in the condensation medium. As a result, the surfactant periodic structure is a template for the co-polymeric matrix, the latter having a periodic structure consistent therewith, as confirmed by an x-ray diffraction pattern of the co-polymeric compound. With the particular B components utilized herein, the resulting matrix comprises a hexagonal arrangement of mesopores. The periodicity is observed to decrease as the relative amount of silane component is lowered.

Accordingly, this invention is also directed to periodic polymers containing microporous cavities provided by covalently bound organic hosts. Cyclodextrin or calixarene hosts, for example, are coupled to a trialkoxysilane group, which is polymerized to form a polysilsesquioxane matrix. Structural integrity is provided by copolymerization with a monomer such as tetraethoxysilane, which produces a polysilicate co-matrix. Periodic order is provided by carrying out the polymerization in the presence of a surfactant such as cetyltrimethylammonium bromide. The resulting as-synthesized polymers were characterized by solid state nuclear magnetic resonance spectroscopy. The $^{13}C$ and $^{29}Si$ spectra provided evidence for intact polysilsesquioxane, polysilicate, organic host, and surfactant. Removal of the surfactant by washing produced a polymer containing cavities of mesoporous dimensions, in addition to the microporous host component cavities. Such mesoporosity is believed to allow enhanced access of guests to the microporous hosts. Transmission electron microscopy demonstrated that both as-synthesized and solvent-extracted polymers have a periodic structure. All polymers are entirely insoluble in water. As-synthesized CD-containing polymers extracted up to >99% of 4-nitrophenol from aqueous solution, and solvent-extracted CX-containing polymers extracted up to 67% of $Fe^{3+}$, and lesser amounts of other metal cations from aqueous solution, with interesting selectivity patterns. Simple filtration can then remove the polymer containing the extracted organic molecule or metal cation. These extraction abilities are superior to previous materials. These and related aspects of this invention are provided in the data and figures associated with examples 43-59, below.

EXAMPLES OF THE INVENTION

The following non-limiting examples and data illustrate various aspects and features relating to the component and polymeric compounds of the present invention, both the periodic and aperiodic compounds available through the synthetic methodologies described herein. In comparison with the prior art, the present compounds and related components provide results and the data which are surprising, unexpected and contrary thereto. While the utility of this invention is illustrated through the use of several compounds, components, reagents and synthetic techniques which can be used therewith, it will be understood by those skilled in the art that comparable results are obtainable with various other compounds, components and reagents, as are commensurate with the scope of this invention.

All polymers of examples 1-42 were characterized, as provided below, by solid state $^{13}$C and $^{29}$Si NMR spectroscopy, FTIR, powder X-ray, SEM, TEM and nitrogen adsorption porosimetry. The pH stability of the Polymers 1 and 3 was tested by stirring samples in solutions buffered to pH 2, 7, or 11 for two days. The polymers were recovered and examined by solid state NMR and FTIR. Molecular weights were not measured for these insoluble polymers, as has normally been the case for insoluble sol-gel polysilicates.

Example 1

Association Properties of Organic Guests. 4-Nitrophenol (2) was selected as

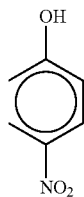

2

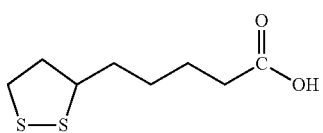

3 the substrate for extensive association studies because it is soluble in water and is UV active. A standard aqueous solution of 2 was prepared with known concentration. The powdered polymer was placed in the solution, and the mixture was stirred vigorously at room temperature (25° C.). The polymer was removed after a period of time, and the concentration of 2 remaining in the aqueous filtrate was measured by UV-vis spectroscopy. The treated polymer was washed with water and soaked in ethanol to remove the associated 2. The concentration of released 2 was measured in the ethanol solution in order to determine the renewability of the polymer.

Figure 2:
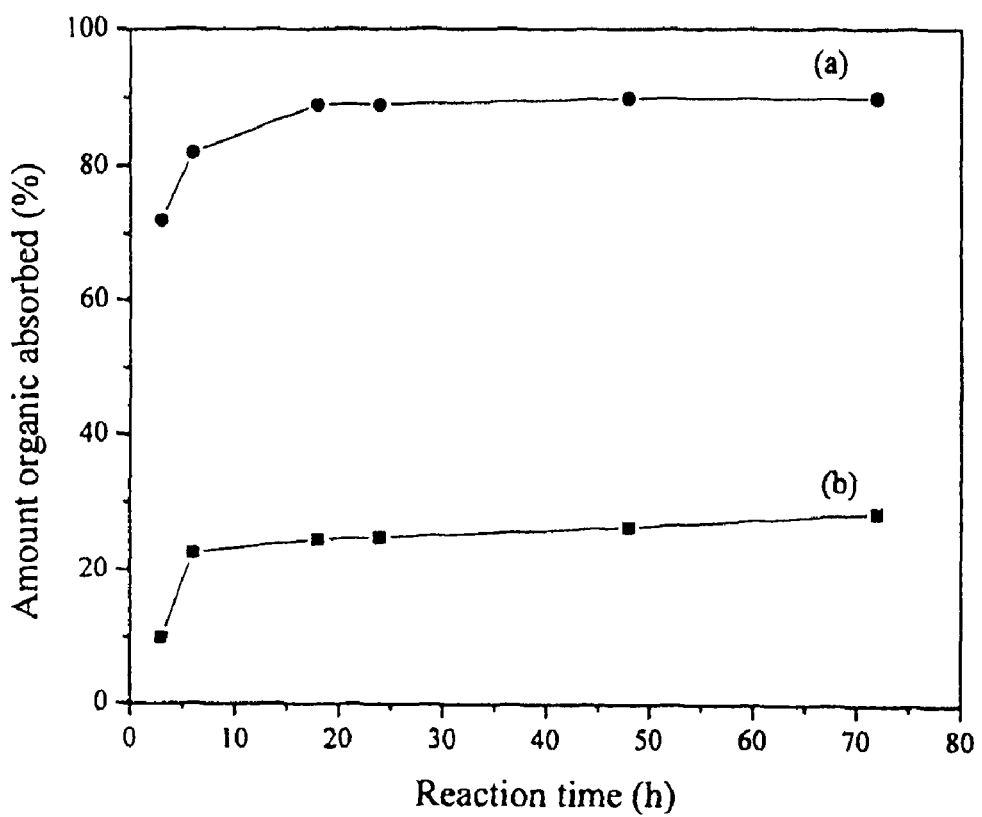
FIG. 2. The effect of reaction time on the absorption by Polymer 1 of 4-nitrophenol ($8.63 \times 10^{-5}$ M in water) for two loading levels: (a) 0.2%, (b) 5%.
Figure 3:
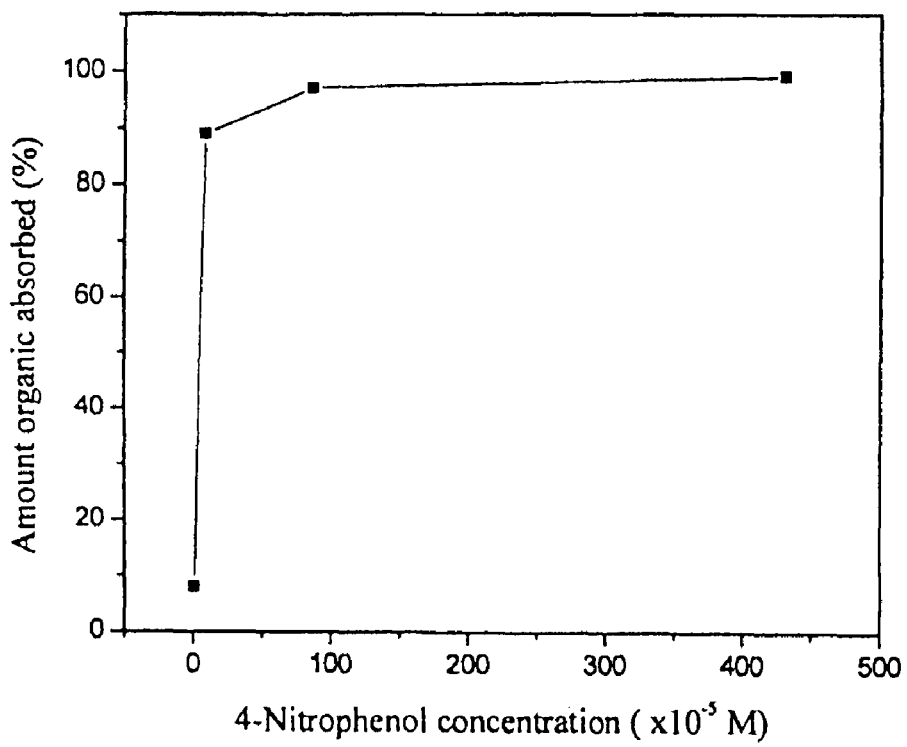
FIG. 3. The effect of solute concentration on the absorption of 4-nitrophenol by Polymer 1 (loading level 0.2%) in water.

The degree of association depends on the structure of the polymer, the structure of the guest, the reaction time, the pH, the concentration of the organic in the solution, and the loading level (defined as the weight of the guest in grams divided by the weight of the host in grams, converted to percentage). FIG. 1 illustrates the effect of loading level for Polymer 1 with 4-nitrophenol for a series of association experiments over the same amount of time and with the same concentration of the organic substrate. Thus only the amount of the insoluble polymer is varied. FIG. 2 illustrates the effect of reaction time for the same materials at constant loading level and concentration of 2. The experiments were carried out for loading levels of 0.2 and 5.0%. FIG. 3 illustrates the effect of substrate concentration and FIG. 4 of pH.

Additional association experiments were carried out on DL-6,8-thioctic acid (3) with Polymer 1. At pH 7, 94% of 3 was absorbed at a 1% loading level and 44% at a 5% loading level.

Association experiments were carried out on 4-nitrophenol with the other six polymers. For a loading level of 0.2%, reaction time of 18 hours, and substrate concentration in water of $8.63 \times 10^{-5}$ M, the percentage absorption was 86% for Polymer 2, 63% for Polymer 3, 46% for Polymer 4, 68% for Polymer 5, 92% for Polymer 6, and 87% for Polymer 7.

Renewability was determined for the removal of 2 from six of the polymers. Expressed as the percentage of 4-nitrophenol released, the renewabilities were 74% for Polymer 1, 71% for Polymer 2, 54% for Polymer 3, 46% for Polymer 5, 42% for Polymer 6, and 41% for Polymer 7.

Finally, the ability of Polymer 1 to extract 4-nitrophenol from aqueous solution was compared with that of several other materials. For a loading level of 0.2%, 18 hours reaction time, and substrate concentration of $8.63 \times 10^{-5}$M, Polymer 1 absorbed 89% of 2, activated carbon 83%, a prior art CD-polyurethane polymer 30%, polymethylsilsesquioxane 7%, and pure silicate formed from tetramethoxylsilane 2%.

Example 2

Association Properties of Inorganic Cations. Aqueous solutions were prepared containing several inorganic cations at known concentrations. These solutions were stirred at 25° C. for 18 hours, and the residual metal cation concentrations were measured by inductively coupled plasma (ICP) spectrophotometry. Tables 2-4 contain the percentages of extracted metals for several of the polymers at various concentrations of metal. The effect of pH on extraction abilities was examined (Table 5) for metal ion concentration of $1.0 \times 10^{-4}$M and 18 hours.

Example 3

Simultaneous Association of Organic Molecules and Inorganic Cations. A solution containing 4-nitrophenol at $8.63 \times 10^{-5}$M and various inorganic ions at $1.0 \times 10^{-4}$ M was stirred for 18 hours at 25° C. with the hybrid Polymers 6 or 7. The percentages of extracted materials are given in Table 6.

Example 4

Gelation Times and Mechanism. The CD-based Monomers 1 and 2 can form monolithic gels within one minute (Table 1) at concentrations as low as 0.13 M. In contrast, methyltrichlorosilane and tetramethoxysilane (TMOS) failed to polymerize to gels at concentrations of 1.0 M or higher. Monomer 2 differs from TMOS by only a single substituent on each silicon atom. The greater mass and volume of the fourth substituent (the CD host) may provide a difference in the ability to polymerize to gels.

The CX-based monomers were somewhat slower in the gelation process. Although Monomer 3 failed to polymerize to a gel at a monomer concentration of 0.13 M, it did form a monolithic gel within seven minutes at only slightly higher concentrations, 0.5 M. In contrast, Monomers 4 and 5 polymerized to gels at 0.2 M, although the process was slower. Monomer 3 may be unique among the five monomers studied, in that it polymerizes from only a single face (see Schemes 1 and 2). The requirement for a higher concentration for Monomer 3 may indicate a fundamentally different process or end structure of the xerogel, for example an arborol xerogel.

The prior art describes three broad classes of alkoxysilyl monomers on the basis of their gelation behavior under acidic conditions: rapid gelation even at low concentration, slow gelation, and no gelation. Monomers 1 and 2 appear to belong to the first class and Monomers 3-5 to the second class. The rate of gelation can be correlated with the mechanism. For purposes of illustration only, in the faster processes, the monomer (Si—O—C) dimerizes and trimerizes (through Si—O—H to Si—O—Si) initially, and polymerization then follows rapidly. The slower processes begin with intramolecular reactions in which the Si—O—Si bonds form within the same molecule (cyclization) rather than with neighbors. These materials then polymerize slowly.

Figure 5:
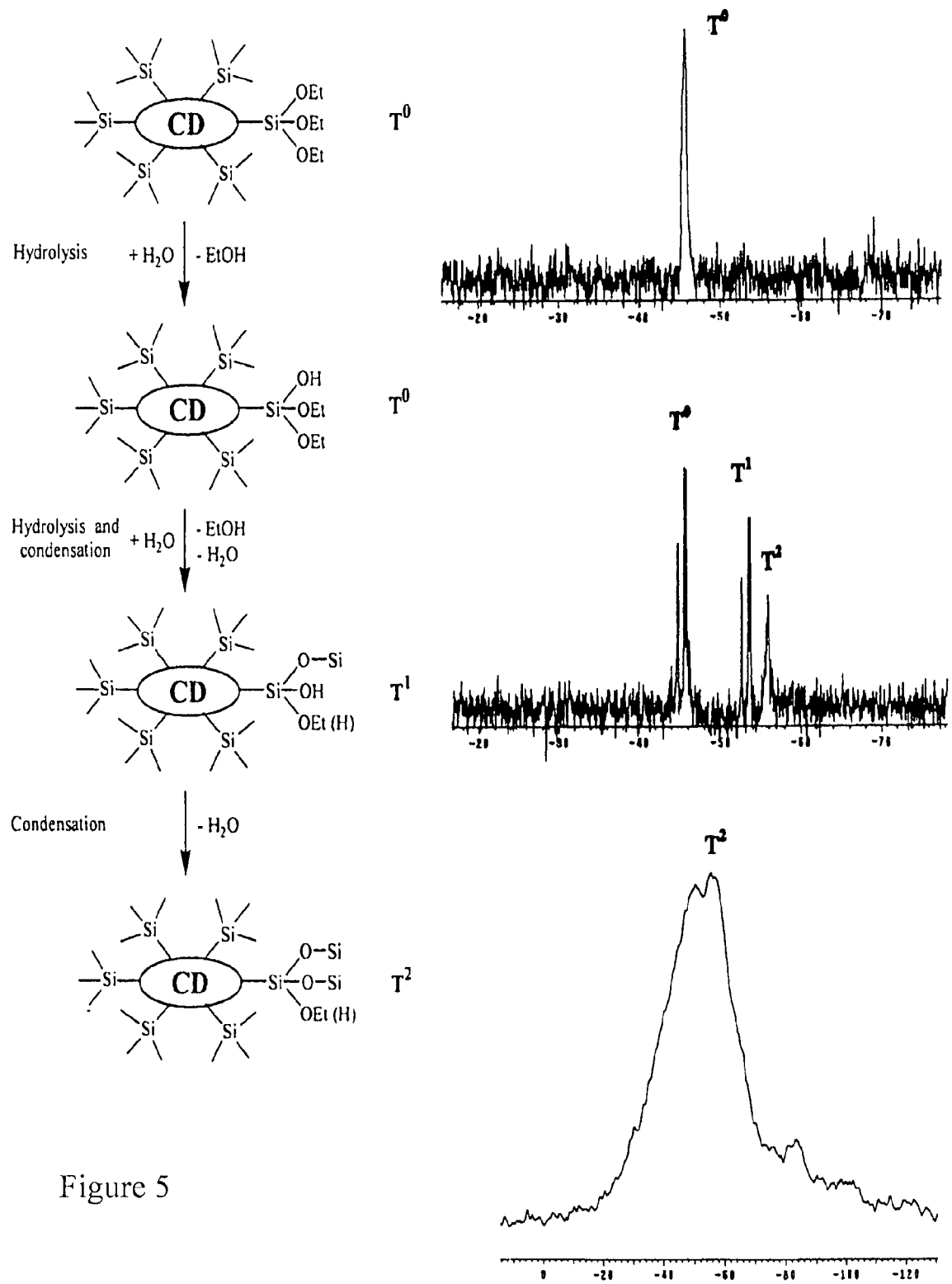
FIG. 5. (right) The $^{29}$Si NMR spectrum of (top) Monomer 1 in CDCl$_3$ (middle) the sol-gel solution in CDCl$_3$ under acidic conditions after the addition of 9 equiv of water, and (bottom) the solid Polymer 1 with magic angle spinning. (left) Diagrams of the progress of hydrolysis and condensation from the starting material at the top to the polymer at the bottom.

The initial stages of polymerization may be followed by using substoichiometric quantities of water in the sol-gel polymerization reaction. There is insufficient water to complete hydrolysis of all the Si—O—C groups. Gelation then is inhibited, and the initial intermediates remain in solution and may be examined by solution-phase $^{29}$Si NMR spectroscopy. With excess water, the product gels out into a solid phase that is unavailable for solution techniques. FIG. 5 shows the results of such an experiment with Monomer 1. The top spectrum of the starting material exhibits a single peak at δ −45.7, a position associated with the $T^0$ structure (Si bonded through oxygen to zero other silicons). The upper left of FIG. 5 schematically illustrates the initial monomer. Hydrolysis of the Si—O—C groups to Si—O—H groups initially generates a variety of $T^0$ peaks, depending on the number of hydrolyzed organic groups (see the second diagram from the top). Dimerization then begins to create Si—O—Si bonds, first of the $T^1$ type (Si bonded through oxygen to one other silicon) and then of the $T^2$ type (Si bonded through oxygen to two other silicons) (see the third and fourth diagrams). Complete condensation eventually would lead to $T^3$ structures, the maximum permitted in these silsesquioxanes in which all the silicons are bonded to a single carbon.

The middle spectrum in FIG. 5 was obtained with the conditions of substoichiometric water. The soluble intermediate species exhibits several $T^0$ peaks, several $T^1$ peaks and at least one $T^2$ peak. As intramolecular bridging normally can lead to only a single $T^1$ species and no higher structures, these observations are consistent with the rapid mechanism described by prior inestigators. The solid state spectrum of the final polymer at the bottom of FIG. 5 is dominated by the $T^2$ species at δ −55 (and the background peak from the NMR tube).

Example 5

Figure 6:
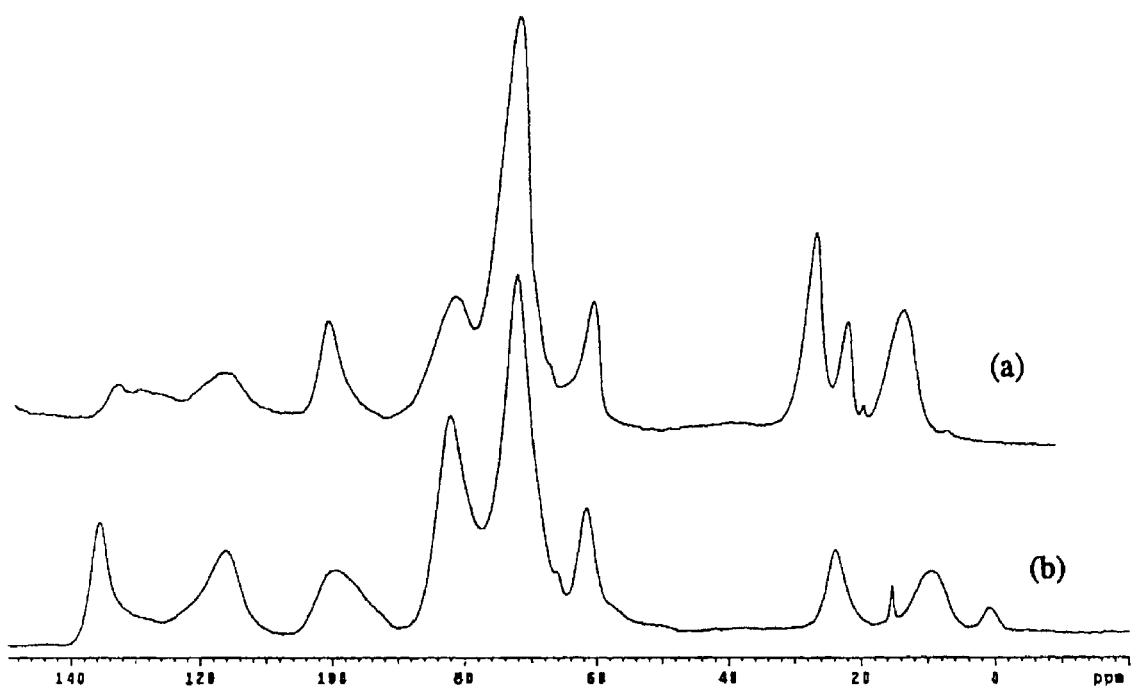
FIG. 6. The solid state $^{13}$C spectra of Polymers 1(a) and 2(b) with magic angle spinning and cross polarization.

Characterization. Further characterization of the structures of the final Polymers 1 and 2 was obtained from solid state $^{13}$C NMR spectroscopy (FIG. 6). The presence of two large peaks in the region δ 65-90 is consistent with the O-bonded carbons in the glucose ring, and the peak at δ 100 corresponds to the anomeric carbon O—C—O. These results confirm that the glucose rings are intact and not hydrolyzed. The peak at δ ca. 60 is from unhydrolyzed O—C bonds in both spectra. The spectrum of Monomer 1 in addition contains a peak at δ 23 from unhydrolyzed O—C—C groups (Monomer 1 contained ethoxy groups, whereas Monomer 2 contained methoxy groups; see Scheme 1). These peaks decreased in intensity during the tests for the stability of the polymer to acidic and basic conditions. The two large peaks at δ ca. 10 and 25 are respectively from the Si—C—C—C—O and Si—C—C—C—O carbons in the linkage between CD and silicon. Unsilylated alkenic carbons appear in the region δ 110-140. The amount is quite small for Monomer 1 but significant for Monomer 2.

Example 6

Figure 7:
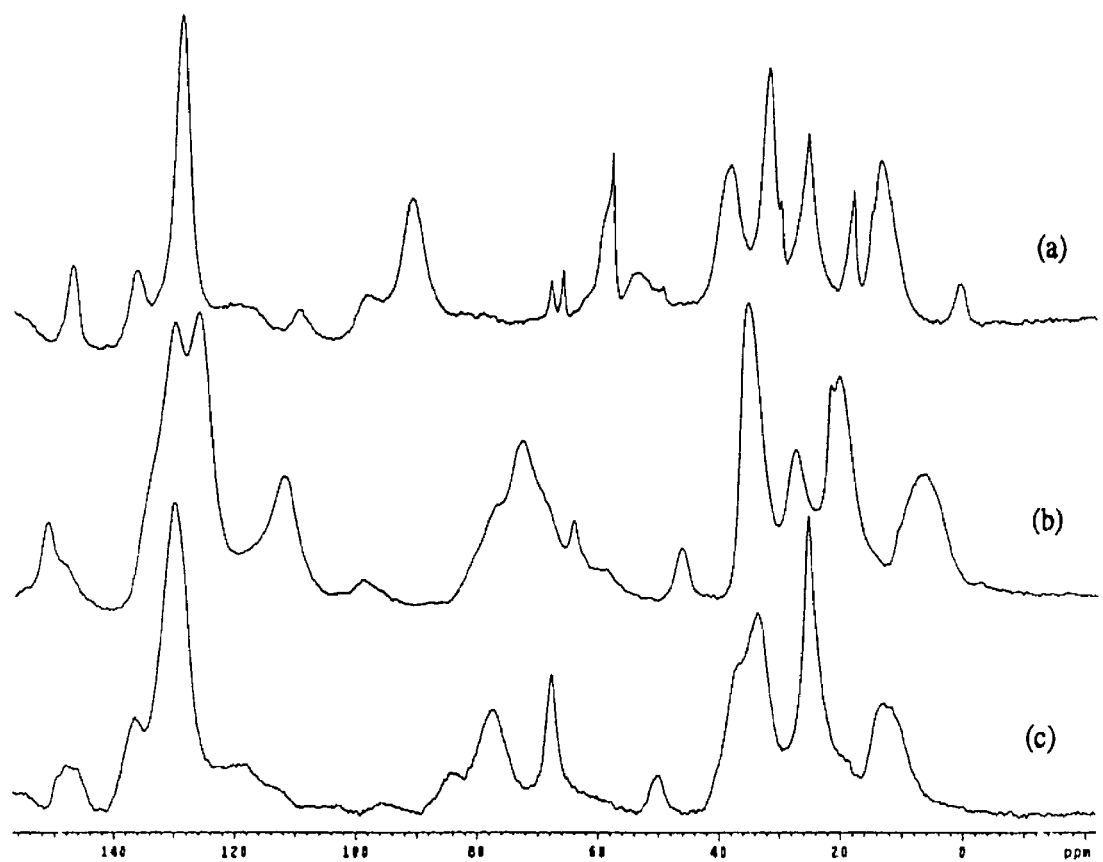
FIG. 7. The solid state $^{13}$C NMR spectra of Polymers 3(a), 4(b), and 5(c) with magic angle spinning and cross polarization.

FIG. 7 contains the solid state $^{13}$C spectra for the CX-based Polymers 3-5. The Si—C—C—C and Si—C—C—C peaks at δ 13 and 25 indicate the presence of the grouping that links CX to silicon. The benzylic carbons are found at δ ca. 30 and the doubly benzylic linkage between the CX aryl groups at δ ca. 40. Polymer 4 in addition has O—C carbons at δ ca. 70. The aromatic carbons of the CX unit concentrate around δ 130 (the quaternary aromatic peaks either are small or are invisible due to poor cross polarization). Hydrosilylation was very effective in Polymers 3 and 5 but less so in Polymer 4 (which required two hydrosilylation reactions per aromatic ring), as witnessed by the peaks at δ 110 and 135 (compare FIG. 6b).

Example 7

The solid state $^{13}$C NMR spectra for the mixed polymers 6 and 7 showed intact glucose rings and CX groupings, as well as all other expected peaks. The $^{13}$C NMR spectra support high levels of hydrosilylation in most cases, intact glucose rings in all CD polymers, intact CX groupings, and the presence of the O—C—C—C linkages in all cases.

Example 8

The solid state $^{29}$Si NMR spectrum of the CD-based Polymer 1 (FIG. 5) has already been seen to contain a peak at δ −55 from $T^2$ species, in which silicon has two siloxy linkages, $Si(OSi)_2$. The $^{29}$Si NMR spectrum of the CX-based Polymer 3 is dominated by this δ −55 peak, but in addition has a smaller peak at δ −64 from $T^3$ species, in which silicon has three siloxy linkages, $Si(OSi)_3$.

Example 9

The infrared spectra of all the polymers contained the Si—O—Si stretching vibration at 1050-1100 cm$^{-1}$. The powder X-ray pattern of Polymer 1 exhibited two broad bands with d spacings of 9.2 and 4.4 Å. The former band corresponds to the diameter of the CD cavity, and the latter band matches the amorphous Si—O—Si distance. The absence of sharp peaks at small angles indicated that there are no highly ordered micropores. Similar patterns were observed for the other polymers.

Example 10

The SEM images of all the polymers indicated no well ordered arrays as in zeolites, but rather a random network exhibiting some porosity. TEM images of Polymers 1 and 3 confirmed this conclusion and indicated that the pore diameter is 1.5-8 nm for CD-based polymers. The CX-based polymers revealed no pore structure. Although the pores in the CD-based polymers could come from either the cyclodextrins or the silsesquioxane network, the absence of pores in the CX-based polymers suggests that the observed pores are likely to be from the cyclodextrin cavity. Apparently the calixarene cavity is too small for the resolution of the TEM experiment.

Example 11

Nitrogen adsorption porosimetry indicated that all polymers have low BET surface areas of 1.1-1.7 m$^2$/g, similar to the values observed previously. These values are much lower than that of activated carbon (ca. 600 m$^2$/g). The strong association of organic molecules with our polymers therefore is less likely to be surface adsorption and more likely to result from host-guest interactions with the CD and CX units within the polymer. Thus the polymers are sufficiently porous to allow guests access to the nanopores or interactive structures offered by CD and CX.

Example 12

Stability of the polymers to high and low pH was monitored by infrared spectroscopy and solid state NMR spectroscopy. The OH vibrations at 3440 and 1383 cm$^{-1}$ from Si—O—H groups became smaller, as condensation continued with time at both high and low pH. The $^{13}$C spectra indicated that the CD and CX units remained intact during these experiments. The disappearance of the ethyl peaks at δ 14.2 and 55.5 (SiOCH$_2$CH$_3$), for example, confirms further polymerization. The $^{29}$Si spectrum indicated an increase in the T$^3$ resonance at δ ca. 64 and the appearance of Q-type resonances from SiO$_4$ units from hydrolysis of C—Si bonds. The Q peaks, however, are quite small in comparison with the T peaks. On whole, exposure to high and low acidity improved the structure of the polymers by increasing the degree of condensation with only small amounts of Si—C bond hydrolysis.

Example 13

Association Properties of Organics. 4-Nitrophenol served as the standard organic guest because of its aqueous solubility and its ultraviolet absorption. Polymer 1 was the subject of several experiments exploring variation of a number of factors. The loading level is a term to describe the amount of the solid polymer present in relation to the amount of dissolved organic (grams guest per grams host in percentage). Weight rather than moles is used because the polymer does not permit calculation of molar ratios. It should provide many sites of nanometer dimension (hence, nanopockets) appropriate in size to absorb the organics. As demonstrated by FIG. 1, the affinity of the polymer is highest and close to quantitative at low loading levels (<0.2%), whereas it drops rapidly to less than 20% organic absorbed at loading levels above 5%. On a g/g basis, the polymer exhibits saturation as the amount of guest increases. This observation may result because surface sites are most effective, because only some interior nanopockets are accessible, or because all sites are filled.

The process of absorption shows relatively little time dependence (FIG. 2). After a very brief delay, absorption rises quickly and achieves the 90% level in about 20 minutes. At high loading levels, when absorption is low, the process still is complete in under 10 minutes. Stirring for extremely long times (18 hours) does not result in a significant increase in the amount of organic absorbed.

Figure 4:
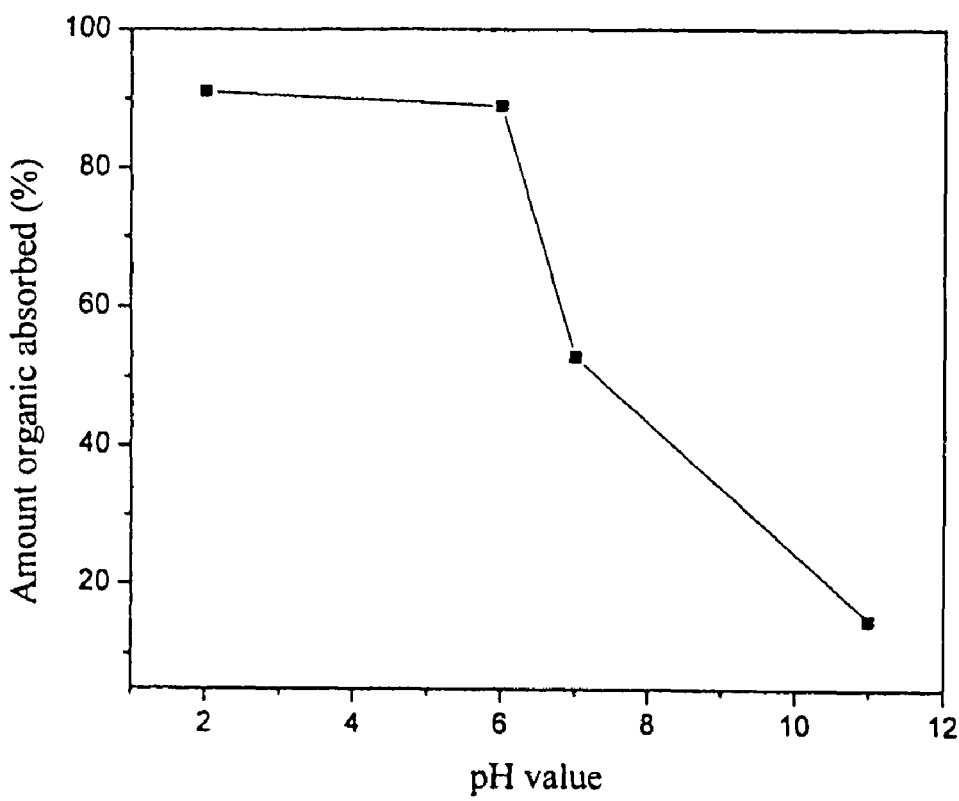
FIG. 4. The effect of pH on the absorption of 4-nitrophenol ($8.63 \times 10^{-5}$ M in water) by Polymer 1 (loading level 0.2%).

The percentage of organic absorbed shows some dependence on the concentration of the organic (FIG. 3). At extremely low levels (<10$^{-5}$M), the percentage of absorbed material drops rapidly. Above this threshold level, it is extremely high (>90%). In this particular experiment, effect was not followed to higher concentrations (>10$^{-2}$ M), but absorption is expected to start to decrease again as the effect of the loading level catches up to the effect of solute concentration. The ability of Polymer 1 to absorb 4-nitrophenol is highest under acidic conditions and falls off at high alkalinity (FIG. 4). This effect may result from the acidity of the phenol. At high pH, the anionic form begins to predominate, and it would be more highly solvated by water and hence less available for absorption by the polymer. Cyclodextrins have been found in general to absorb neutral, polar organics most efficiently. Polymers 1 and 2 can be effective in absorbing neutral organics. The present investigation was limited only by the experimental design that required ultraviolet absorption for measurement of substrate concentrations. A larger, more functional molecule, DL-6,8-thioctic acid (3) was also tested for absorption. Like 4-nitrophenol, 3 was efficiently removed (94%) at low loading levels (1%), but removal decreased to 44% at a loading level of 5%. Thus the affinity of carboxylic acids to our polymers is similar to that of phenols.

Example 14

The remaining polymers also were tested for the ability to absorb 4-nitrophenol. All the CD-based polymers absorbed ca. 90% of 2 at a loading level of 0.2%. The CX-based polymers, however, exhibited lower affinity for this material, 46-68% under the same conditions. Thus cyclodextrins are very effective in all formulations. Even the calixarenes showed very good abilities to absorb this neutral organic.

Example 15

The polymers of this invention have practical use applications, and are at least somewhat renewable. By way of comparison, activated charcoal not only is expensive but it also is nonrenewable. It must be discarded after use. All polymers tested were renewable to some extent. The CD-based polymers released >70% of absorbed 4-nitrophenol, and the CX-based polymers released >40%. Thus cyclodextrins release the organic somewhat more effectively than the calixarenes.

Polymer 1 was compared with various other materials in terms of ability to remove 4-nitrophenol from aqueous solution. Polymer 1 was found superior to all other materials tested. Under a common set of conditions, Polymer 1 removed 89%, whereas activated charcoal removed 83%, demonstrating Polymer 1 is at least as good as activated carbon and largely renewable. A CD-containing urethane polymer of the prior art, absorbs only about 30% of 2 under these conditions. In such a polymer, CD units are doubly connected to chains of the form —O(CO)NH(CH$_2$)$_6$NH(CO) O—, illustrating an important difference between CD embedded in polysilsesquioxanes and in polyurethanes. The two polymers may differ in the number of cyclodextrin sites are available, either because fewer CD units were incorporated into urethane or because fewer are accessible. Alternatively, the silsesquioxane superstructure may offer a synergistic effect. The latter hypothesis was tested by examining the abilities of polymethylsilsesquioxane from methyltrichlorosilane and of silicate from tetramethoxysilane to absorb 2. Although both materials exhibited poor abilities (respectively 7% and 2%), they were not negligible. The 7% absorption by polymethylsilsesquioxane, however, could not explain the entire difference between the silicate and urethane polymers. Consequently, it is believed that the primary effect is better availability of the CD nanopockets in the polysilsesquioxane matrix, although synergism may enhance the effect slightly. It also should be noted that the sugar and silicon constituents of Polymer 1 should exhibit very low degrees of toxicity, whereas the toxicity of urethanes would have to be tested in this context.

Example 16

Association Properties of Inorganic Cations. The abilities of the CX-based polymers to remove inorganic cations from aqueous solution were examined, using the tetrameric calixarenes, as representative of many other varieties, in which the number of phenolic units varies (for example, six or eight) or in which phenol is replaced by another organic entity. CX-based Polymers 3 and 5 and the hybrid Polymers 6 and 7 proved to be effective and selective for removal of iron cations (Tables 2-4). These experiments were carried out with several inorganic ions present in solution. Their percentages were measured before and after treatment with the polymers. There is a small dependence on concentration, with slightly higher percentages of $Fe^{3+}$ extracted at $10^{-4}$ M than at $10^{-3}$ M. Polymers 3 and 5-7 showed small affinities for potassium, copper, europium, and barium cations. The ability of Polymers 3 and 6 to absorb iron is pH dependent (Table 5). Within the pH range 2-5, the ability decreased with increasing acidity. Polymer 4 was ineffective at removing any inorganic cation. Of the CD-based polymers, it is the only one lacking hydroxyl groups. Polymers 3, 5, and 6 all have a crown of hydroxyl groups, which must be critical in binding with metal cations.

The abilities of the hybrid Polymers 6 and 7 to absorb 4-nitrophenol and metal cations simultaneously were also considered (Table 6). These two processes occurred quite independently. Both polymers absorbed about 90% of 2, 30% of $Fe^{3+}$, and 2-4% of $Cu^{2+}$ in a single experiment, comparable to the experiments in which the polymers were treated separately with organics or inorganic cations. Clearly, the sites available for organics and for inorganic cations are entirely distinct.

Example 17

Regarding materials used herein, Cycloheptaamylose (β-CD) was obtained from Aldrich Chemical Company, Inc., purified by recrystallization from $H_2O$ three times, and dried at 110° C. for 12 h. Calix[4]arene was prepared according to published literature procedures.

For purposes of composition characterization, FTIR spectra were recorded on KBr pellets using a FTS60 spectrophotometer. Liquid state $^1H$ and $^{13}C$ NMR spectra were recorded on a Varian Mercury 400 spectrometer operating at 400.2 MHz ($^1H$) and 100.6 MHz ($^{13}C$). Liquid state $^{29}Si$ NMR spectra were recorded on a Varian Inova 400 spectrometer operating at 79.5 MHz. High-resolution $^{13}C$ and $^{29}Si$ solid state NMR spectra were run at 75.5 and 59.6 MHz, respectively, on a Varian VXR300 spectrometer with a $ZrO_2$ rotor and two aurum caps. The spinning speed ranged between 3 and 4 kHz. Mass spectra were recorded on either a negative-ion mode JEOL DX-303 spectrometer or a Varian MAT 311A EI instrument. UV-vis spectra were recorded at 25° C. with a Varian Cary 1E double beam UV-vis spectrophotometer. The ICP-AES data were obtained with a Thermal Jarrell Ash Atomscan Model 25 Sequential Inductively Coupled Plasma Atomic Emission Spectrometer. The XRD patterns were obtained with a Rigaku DMAX-A diffractometer using Cu Kα radiation. The BET surface areas were determined by $N_2$ adsorption at liquid nitrogen temperature with a Micromeritics ASAP 2010 porosimeter. SEM images were acquired on a Hitachi 54500-II scanning electron microscope with an acceleration voltage of 3 kV. TEM images were recorded on a Hitachi HI8100 200-kV transmission electron microscopy.

Example 18

Tetradecakis-2,6-O-allylcycloheptaamylose (1') was prepared (Scheme 1) in 67% yield after recrystallization according to the prior art method of Bergeron and Meeley: MS (negative-ion FAB) m/z 1694 (17, M-1).

Example 19

Heptakis-3-O-methyltetradecakis-2,6-O-allylcycloheptaamylose (2') was prepared (Scheme 1) in 76% yield after recrystallization according to the method of Bergeron and Meeley.

Example 20

Tetradecakis-2,6-di-O-(3-triethoxypropyl)cycloheptaamylose (Monomer 1). A 100 mL, round-bottomed flask containing 0.5 g (0.3 mmol) of 1', equipped with a reflux condenser, a magnetic stirrer, and a two-way stopcock, was evacuated and charged three times with dry $N_2$. The flask was charged with 45 mL of tetrahydrofuran (THF) and 0.5 mL of a THF solution of $Cp_2PtCl_2$ (1 mg/mL). The mixture was stirred at room temperature for 30 min, and 5.7 mL (31 mmol) of triethoxysilane was added. The resulting mixture was stirred and subsequently warmed to 60° C. for 72 h. The solvent and excess triethoxysilane were removed in vacuo under $N_2$. The product Monomer 1 (Scheme 1) was obtained as a white sticky solid: $^1H$ NMR ($CDCl_3$) δ 0.60 (m, $SiCH_2$), 0.91 (m, SiCH), 1.22 (t, $CH_3CH_2O$), 1.55 (m, $SiCHCH_3$), 1.70 (m, $SiCH_2CH_2$, $CH_3CH=CH$), 3.2-4.0 (m, $SiOCH_2$, H4, H5, H6, H2, H3, $CH_2-CH=CH_2$, $CH_2OCH_2-CH=CH_2$), 4.7-5.1 (m, $CH=CH-CH_3$, $CH_2=CH$, H1), 5.9-6.3 (m, $CH=CH-CH_3$, $CH=CH_2$); $^{13}C$ NMR ($CDCl_3$) δ 6.4, 6.8, 9.6, 10.3, 10.8, 12.3, 12.7, 18.2, 18.3, 18.5, 23.2, 58.4, 59.3, 68.9, 70.6, 72.4, 73.4, 74.1, 75.4, 80.5, 83.4, 98.9, 101.9, 116.9, 134.6, 145.9; $^{29}Si$ NMR ($CDCl_3$) δ −45.8.

Example 21

Heptakis-3-O-methyltetradecakis-2,6-di-O-(3-trimethoxypropyl)cyclo-heptaamylose (Monomer 2). A 100 mL, round-bottomed flask containing 0.5 g (0.3 mmol) of 2', equipped with a reflux condenser, a magnetic stirrer, and a two-way stopcock, was evacuated and charged three times with dry $N_2$. The flask was charged with 30 mL of THF and 0.5 mL of a THF solution of $Cp_2PtCl_2$ (1 mg/mL). The mixture was stirred at room temperature for 30 min, and 2.5 mL (19.5 mmol) of trimethoxysilane was added. The resulting mixture was stirred and subsequently warmed to 60° C. for 72 h. The solvent and excess trimethoxysilane were removed in vacuo under $N_2$. The product Monomer 2 (Scheme 1) was obtained as a light yellow sticky solid: IR (KBr) 2931 (C—H), 1645 ($CH_2=CH$), 1093 (Si—$OCH_3$); $^1H$ NMR ($CDCl_3$) δ 0.60 (m, $SiCH_2$), 0.68 (m, $SiCH_2$), 1.66 (m, $SiCH_2CH_2$), 3.21-4.25 (m, $OCH_3$, $SiOCH_3$, H4, H5, 1-16, H2, H3, $CH_2-C=C$, $OCH_2-C=C$), 5.11, 5.20-5.29 (m, $CH_2-C$, H1), 5.89 (m, $CH=C$); $^{13}C$ NMR ($CDCl_3$) δ 6.6, 6.9, 24.4, 50.3, 50.9, 51.6, 62.5, 70.5, 72.4, 72.8, 74.4, 81.2, 82.1, 83.2, 100.6, 116.6, 136.2, 136.3; $^{29}Si$ NMR ($CDCl_3$) δ −42.3, −42.7.

Example 22

25,26,27,28-Tetrahydroxycalix[4]arene (3') was prepared (Scheme 2) by the prior art method of Gutsche and Lin in 73% yield after recrystallization, mp 313-315° C.: MS (EI, 90 eV) m/z 424 (100, M).

Example 23

25,26,27,28-Tetra(allyloxy)calix[4]arene (4') was prepared (Scheme 2) by the method of Gutsche et al. in 64% yield after recrystallization, mp 184-5° C.: MS (EI, 90 eV) m/z 584 (100, M).

Example 24

5,11,17,23-Tetraallyl-25,26,27,28-tetrahydroxycalix[4]arene (5') was prepared (Scheme 2) according to the method of Gutsche et al. in 69% yield after chromatography: MS (EI, 90 eV), m/z 584 (100, M).

Example 25

5,11,17,23-Tetraallyl-25,26,27,28-tetra(allyloxy)calix[4]arene (6'). A suspension of 5' (1.17 g, 2.0 mmol), anhydrous $K_2CO_3$ (4.42 g, 32.0 mmol), allyl bromide (3.87 g, 32.0 mmol), and $CH_3CN$ (200 mL) was stirred and refluxed for 48 h. After evaporation of the solvent, the mixture was added to 100 mL of $CH_2Cl_2$ and washed with 3% HCl (2×100 mL) and $H_2O$ (2×100 mL). The organic layer was dried ($Na_2SO_4$), the solvent was evaporated, and the residue was purified by flash chromatography over silica gel 60 with 1/1 petroleum ether/$CH_2Cl_2$ to afford 0.97 g (65%) of 6' as white crystals (Scheme 2): $^1H$ NMR ($CDCl_3$) δ 6.79 (s, 8H, ArH), 5.94-5.80 (m, 8H, CH=C), 5.16-4.97 (m, 16H, $CH_2$=C), 4.10 (s, 8H, $OCH_2$), 3.57 (s, 8H, $CH_2$C=), 3.18 (s, 8H, $ArCH_2Ar$); $^{13}C$ NMR ($CDCl_3$) δ 37.6, 39.9, 71.4, 115.3, 115.6, 131.1, 132.8, 133.8, 134.3, 138.3, 154.2; MS (EI, 90 eV) m/z 744 (100, M). Anal. Calcd for $C_{52}H_{56}O_4$: C, 83.87; H, 7.53. Found: C, 83.81; H, 7.58.

Example 26

CX-based Dimer (7'). According to the method of Hajek et al., a solution of 5' (1.26 g, 2.15 mmol) in dry THF (60 mL) was charged with NaH (0.345 g, 14.4 mmol). The mixture was stirred under $N_2$ for 20 h at room temperature, and $SiCl_4$ (0.3 mL, 2.61 mmol) was added in one portion. The mixture was stirred at room temperature for another 3 h, the solvent was removed, and the solid thus obtained was dissolved in 100 mL of ethyl ether. The insoluble solid was removed by filtration, and the solvent in the filtrate was removed by rotary evaporation to afford a light yellow solid. The solid was purified by flash chromatography (1/1 $CH_2Cl_2$/hexane) to provide 0.62 g (48%) of 7' as a white solid, mp 300° C. (Scheme 2): $^1H$ NMR ($CDCl_3$) δ 3.12 (d, 8H, $ArCH_2$C=), 3.31 (d, 4H, $ArCH_2Ar$), 3.40 (d, 4H, $ArCH_2Ar$), 4.46 (d, 4H, $ArCH_2Ar$), 4.54 (d, 4H, $ArCH_2Ar$), 4.94-5.12 (m, 16H, $CH_2$=C), 5.80-6.08 (m, 8H, CH=C), 6.74 (s, 4H, ArH), 6.88 (s, 8H, ArH), 6.93 (d, 4H, ArH); $^{13}C$ NMR ($CDCl_3$) δ 33.7, 34.5, 39.6, 39.9, 40.0, 115.5, 115.8, 115.9, 128.5, 128.5, 129.5, 129.8, 129.9, 130.4, 132.9, 133.8, 134.2, 135.8, 137.6, 137.8, 137.9, 145.5, 146.7, 148.9; $^{29}Si$ NMR ($CDCl_3$) δ −112.33.

Example 27

5,11,17,23-Tetrakis[3-(triethoxysilyl)propyl]-25,26,27,28-tetrahydroxycalix[4]arene (Monomer 3). A 100 mL, round-bottomed flask containing 0.32 g (0.54 mmol) of 5', equipped with a reflux condenser, a magnetic stirrer, and a two-way stopcock, was evacuated and charged three times with dry $N_2$. The flask then was charged with 30 mL of THF and 0.5 mL of a THF solution of $Cp_2PtCl_2$ (1 mg/mL). The mixture was stirred at room temperature for 30 min, and 1.07 g (6.5 mmol) of triethoxysilane was added. The resulting mixture was stirred and subsequently warmed to 60° C. for 72 h. The solvent and excess triethoxysilane were removed in vacuo under $N_2$. The product CX-based Monomer 3 (Scheme 2) was obtained as a light yellow sticky solid: $^1H$ NMR ($CDCl_3$) δ 0.65 (m, 8H, $SiCH_2$), 1.22 (t, 36H, $OCH_2CH_3$), 1.65 (m, 8H, $SiCH_2CH_2$), 2.42 (m, 8H, $SiCH_2CH_2CH_2Ar$), 4.22 (br d, 4H, $ArCH_2Ar$), 3.44 (br d, 4H, $ArCH_2Ar$), 3.81 (q, 24H, $OCH_2CH_3$), 6.84 (s, 8H, ArH), 10.19 (s, 4H, OH); $^{13}C$ NMR ($CDCl_3$) δ 10.5, 18.5, 25.2, 32.2, 38.7, 58.5, 128.1, 128.9, 135.9, 146.7; $^{29}Si$ NMR ($CDCl_3$) δ −45.0.

Example 28

5,11,17,23-Tetrakis[3-(trimethoxysilyl)propyl]-25,26,27,28-tetrakis[3-(trimethoxysilyl)propyloxy]calix[4]arene (Monomer 4). A 100 mL, round-bottomed flask containing 0.4 g (0.54 mmol) of 6', equipped with a reflux condenser, a magnetic stirrer, and a two-way stopcock, was evacuated and charged three times with dry $N_2$. The flask was charged with 30 mL of THF and 0.5 mL of a THF solution of $Cp_2PtCl_2$ (1 mg/mL). The mixture was stirred at room temperature for 30 min, and 2.64 g (21.6 mmol) of trimethoxysilane was added. The resulting mixture was stirred and subsequently warmed to 60° C. for 72 h. The solvent and excess trimethoxysilane were removed in vacuo under $N_2$. The product CX-based Monomer 4 (Scheme 2) was obtained as a light yellow sticky solid: $^1H$ NMR ($CDCl_3$) δ 0.70 (m, $SiCH_2$), 1.8 (m, $SiCH_2CH_2$), 2.4 (m, Si—$CH_2$—$CH_2$—$CH_2$—Ar), 3.05-4.20 (m, Si—$CH_2$—$CH_2$—$CH_2$—O, $SiOCH_3$, $ArCH_2Ar$), 4.9-5.1 (m, $CH_2$=C), 5.8-6.0 (m, CH=C), 6.7-6.9 (m, ArH); $^{13}C$ NMR ($CDCl_3$) δ 9.9, 10.1, 24.0, 25.4, 38.8, 40.2, 50.4, 51.3, 115.1, 128.4, 131.5, 134.2, 138.3, 154.1; $^{29}Si$ NMR ($CDCl_3$) δ −42.3, −42.7.

Example 29

CX-based Monomer 5. A 100 mL, round-bottomed flask containing 0.4 g (0.33 mmol) of 7', equipped with a reflux condenser, a magnetic stirrer and a two-way stopcock, was evacuated and charged three times with dry $N_2$. The flask was charged with 30 mL of THF and 0.5 mL of a THF solution of $Cp_2PtCl_2$ (1 mg/mL). The mixture was stirred at room temperature for 30 min, and 1.61 g (13.2 mmol) of trimethoxysilane was added. The resulting mixture was stirred and subsequently warmed to 60° C. for 72 h. The solvent and excess trimethoxysilane were removed in vacuo under $N_2$. The product CX-based Monomer 5 (Scheme 2) was obtained as a light yellow sticky solid: $^1H$ NMR ($CDCl_3$) δ 0.5-0.8 (m, $SiCH_2$), 1.55-1.81 (m, $SiCH_2CH_2$,), 2.28-2.60 (m, $SiCH_2CH_2CH_2$), 3.23-3.54, 4.40-4.61 (m, $ArCH_2Ar$), 3.61 (m, $OCH_3$), 6.75, 6.87, 6.95 (m, ArH); $^{13}C$ NMR ($CDCl_3$) δ 9.2, 9.3, 24.3, 24.5, 33.2, 33.5, 35.4, 39.0, 39.7, 52.1, 128.4, 128.6, 129.1, 129.2, 129.3, 130.1, 136.6, 136.8, 137.6, 145.2, 146.8, 148.1; $^{29}Si$ NMR ($CDCl_3$) δ −41.7, −112.8.

Example 30

CD-based Polymer 1. In a 50 mL Schlenk flask under $N_2$, 2.9 mmol of Monomer 1 and 11.5 mL of dry THF were mixed and stirred vigorously. The aqueous HCl acid catalyst (1.97 mL, 1 N) was premixed with 11.5 mL of dry THF and added in one portion to the flask. The aqueous acid was miscible with the THF solution of Mono-mer 1. The clear, homogeneous solution was stirred for an additional 1 min. Stirring then was stopped and gelation occurred to form at first a gel that occupied the same volume as the initial solution. The gel was allowed to stand in order to age at room temperature for a week. The resulting light yellow solid (Scheme 3) was crushed, washed with ethyl ether (3×50 mL), and dried for 48 h at room temperature under high vacuum (0.45 torr).

Example 31

CD-based Polymer 2. In a 25 mL Schlenk flask under $N_2$, 1.32 g (0.5 mmol) of Monomer 2 and 2 mL of dry THF were mixed and stirred vigorously. The aqueous HCl acid catalyst (0.31 mL, 1 N) was premixed with 2 mL of dry THF and added in one portion to the flask. The aqueous acid was miscible with the THF solution of Monomer 2. The clear, homogeneous solution was stirred for an additional 0.5 min. Stirring was then stopped and gelation occurred to form at first a gel that occupied the same volume as the initial solution. The gel was allowed to stand to age at room temperature for a week. The resulting light yellow solid (Scheme 3) was then crushed, washed with ethyl ether (3×50 mL), and dried for 48 h at room temperature under high vacuum (0.45 torr).

Example 32

Polymethylsilsesquioxane. In a 100 mL Schlenk flask under $N_2$, 7.5 g (0.05 mol) of methyltrichlorosilane and 25 mL of dry THF were mixed and stirred vigorously. The aqueous HCl acid catalyst (1.35 mL, 1 N) was premixed with 25 mL of dry THF and added in one portion to the flask. The clear, homogeneous solution was stirred for 7 days. No gel formed. After concentration of the solution to a viscous oil, gelation occurred. After an additional 48 h, the white gel was crushed, washed with ethyl ether (3×100 mL), and dried for 48 h at room temperature under vacuum (0.45 torr).

Example 33

Silicate Polymer. In a 100 mL Schlenk flask under $N_2$, 7.6 g (0.05 mol) of tetramethoxysilane and 25 mL of dry THF were mixed and stirred vigorously. The aqueous HCl acid catalyst (1.8 mL, 1 N) was premixed with 25 mL of dry THF and added in one portion to the flask. The clear, homogeneous solution was stirred for 7 days. No gel formed. After concentration of the solution to a viscous oil, gelation occurred. After an additional 48 h aging, the white gel was crushed, washed with ethyl ether (3×100 mL), and dried for 48 h at room temperature under vacuum (0.45 torr).

Example 34

CX-based Polymer 3. In a 50 mL Schlenk flask under $N_2$, 3.78 g (3.6 mmol) of Monomer 3 and 3.6 mL of dry THF were mixed and stirred vigorously. The aqueous HCl acid catalyst (0.78 mL, 1 N) was premixed with 3.6 mL of dry THF and added in one portion to the flask. The aqueous acid was miscible with the THF solution of Monomer 3. The clear, homogeneous solution was stirred for an additional 7 min. Stirring was stopped and gelation occurred to form at first a gel that occupied the same volume as the initial solution. The gel was allowed to stand to age at room temperature for a week. The resulting light yellow gel then was crushed, washed with 50 mL of $H_2O$, 50 mL of $CH_3OH$, 50 mL of acetone, and 50 mL of ethyl ether. The solid (Scheme 4) was dried for 48 h at 50° C. under high vacuum (0.45 torr).

Example 35

CX-based Polymer 4. In a 25 mL Schlenk flask under $N_2$, 1.4 g (1 mmol) of Monomer 4 and 2.5 mL of dry THF were mixed and stirred vigorously. The aqueous HCl acid catalyst (0.43 mL, 1 N) was premixed with 2.5 mL of dry THF and added in one portion to the flask. The aqueous acid was miscible with the THF solution of Monomer 4. The clear, homogeneous solution was stirred for an additional 2 h. Stirring then was stopped and gelation occurred to form at first a gel that occupied the same volume as the initial solution. The gel was allowed to stand to age at room temperature for a week. The resulting light yellow solid (Scheme 4) was then crushed, washed with $H_2O$, $CH_3OH$, and ethyl ether, and dried for 48 h at room temperature under high vacuum (0.45 torr).

Example 36

CX-based Polymer 5. In a 25 mL Schlenk flask under $N_2$, 0.87 g (0.4 mmol) of Monomer 5 and 1 mL of dry THF were mixed and stirred vigorously. The aqueous HCl acid catalyst (0.17 mL, 1 N) was premixed with 1 mL of dry THF and added in one portion to the flask. The aqueous acid was miscible with the THF solution of Monomer 5. The clear, homogeneous solution was stirred for an additional 37 min. Stirring then was stopped and gelation occurred to form at first a gel that occupied the same volume as the initial solution. The polymer gel was allowed to stand to age at room temperature for a week, and the resulting light yellow solid then was crushed, washed with $H_2O$, $CH_3OH$, and ethyl ether, and dried for 48 h at room temperature under high vacuum (0.45 torr). This polymer still had calixarene units connected by silicate linkages. In order to free the hydroxy groups, a solution of the polymer (400 mg, 0.49 mmol) in 10 mL of THF was treated dropwise with tetrabutylammonium fluoride (1.0 M in THF, 4.5 mL, 4.5 mmol) and stirred for 36 h. The resulting mixture was filtered, and the solid Polymer 5 (Scheme 4) was washed with $H_2O$, $CH_3OH$, acetone, and diethyl ether.

Example 37

CD- and CX-based Polymer 6. A 500 mL, round-bottomed flask containing 7.0 g (4.13 mmol) of 1' and 2.4 g (4.13 mmol) of compound 5', equipped with a reflux condenser, a magnetic stirrer, and a two-way stopcock, was evacuated and charged three times with dry $N_2$. The flask was charged with 150 mL of THF and 2 mL of a THF solution of $Cp_2PtCl_2$ (1 mg/mL). The mixture was stirred at room temperature for 30 min, and 35.4 g (0.22 mol) of triethoxysilane was added. The resulting mixture was stirred and subsequently warmed to 60° C. for 72 h. The solvent and excess triethoxysilane were removed by vacuum distillation under $N_2$ to form a mixture of Monomers 1 and 3. Then 21 mL of THF was added to the residue, and the mixture was stirred vigorously. The aqueous HCl acid catalyst (3.70 mL, 1 N) was premixed with 21 mL of dry THF and added in one portion to the flask. The clear, homogeneous solution was stirred for an additional 3 min. Stirring then was stopped and gelation occurred to form at first a gel that occupied the same volume as the initial solution. The gel was allowed to stand to age at room temperature for a week, and the resulting light yellow solid (Scheme 5) was then crushed, washed with $H_2O$, ethanol, and ethyl ether, and dried for 48 h at room temperature under high vacuum (0.45 torr).

Example 38

CD- and CX-based Polymer 7. In a 25 mL Schlenk flask under $N_2$, 1.2 g (0.5 mmol) of CD-based Monomer 2, 1.1 g (0.5 mmol) of CX-based Monomer 5, and 2.5 mL of dry THF were mixed and stirred vigorously. The aqueous HCl acid catalyst (0.18 mL, 1 N) was premixed with 2.5 mL of dry THF and added in one portion to the flask. The aqueous acid was miscible with the THF solution of monomers. The clear, homogeneous solution was stirred for an additional 2 min. Stirring then was stopped and gelation occurred to form at first a gel that occupied the same volume as the initial solution. The polymer was allowed to stand to age at room temperature for a week, and the resulting light yellow solid then was crushed, washed with $H_2O$, $CH_3OH$, and ethyl ether, and dried for 48 h at room temperature under high vacuum (0.45 torr). This polymer still had calixarene units connected by silicate linkages. In order to free the hydroxy groups, a solution of the polymer (1.99 g, 0.5 mmol) in 40 mL of THF was treated dropwise with tetrabutylammonium fluoride (1.0 M in THF, 10 mL, 10 mmol) and stirred for 36 h. The resulting mixture was filtered, and the solid polymer (Scheme 5) was washed with $H_2O$, $CH_3OH$, acetone, and diethyl ether.

Example 39

Extraction of 4-Nitrophenol by CD-based Polymer 1. Polymer 1 (265 mg) was stirred with 50 mL of a buffered aqueous solution (pH 2.0) of 4-nitrophenol ($8.63 \times 10^{-5}$ M) at 25° C. for 18 h. The suspension was filtered, and the residual concentration of 4-nitrophenol in the filtrate was measured by UV-vis spectroscopy. The amount of 4-nitrophenol extracted into Polymer 1 was determined by subtracting the amount of 4-nitrophenol in the filtrate from that of the untreated 4-nitrophenol solution. The same procedure was used with variation of extraction time, pH, concentration of 4-nitrophenol, and the amount of polymer.

Example 40

Regeneration of 4-Nitrophenol-loaded CD-based Polymer 1. Polymer 1 (200 mg) loaded with a known amount of 4-nitrophenol was stirred in 30 mL of pure ethanol at 25° C. for 24 h. The suspension was filtered, and the 4-nitrophenol concentration in the ethanol filtrate was measured by UV-vis spectroscopy. The amount of 4-nitrophenol removed from Polymer 1 then was determined by subtraction.

Example 41

Extraction of Metal Cations by CX-based Polymer 3. Polymer 3 (100 mg) was stirred with 50 mL of a buffered aqueous solution (pH 5.0) containing $Fe^{3+}$, $Cu^{2+}$, $Co^{2+}$, and $Cr^{3+}$ ($1.0 \times 10^{-4}$ M for each metal cation) at 25° C. for 18 h. The suspension was filtered, and the residual metal cation concentrations in the filtrate were measured by ICP-AE spectroscopy. The amounts of $Fe^{3+}$, $Cu^{2+}$, $Co^{2+}$, and $Cr^{2+}$ extracted by Polymer 3 were determined by subtracting the respective amounts of the ions in the filtrate from those of the untreated metal cation solution. The experiment was repeated with a higher concentration of the same ions ($1.0 \times 10^{-3}$ M for each metal cation) and with other metal cations. Similar experiments were carried out in which Polymers 4, 5, 6, and 7 were used to extract metal ions.

Example 42

Simultaneous Extraction of 4-Nitrophenol and Metal Cations by CD- and CX-based Polymer 6. Polymer 6 (355 mg) was stirred with 50 mL of buffered aqueous solution (pH 5.0) containing 4-nitrophenol ($8.63 \times 10^{-5}$ M) and $Fe^{3+}$, $Cu^{2+}$, $Co^{2+}$, $Ni^{2+}$, and $Cr^{3+}$ ($1.0 \times 10^{-4}$ M for each metal cation) at 25° C. for 18 h. The suspension was filtered, and the residual concentrations of 4-nitrophenol and metal cations in the filtrate were measured respectively by UV-vis spectroscopy and ICP-AE spectroscopy. The amount of 4-nitrophenol extracted by Polymer 6 was determined by subtracting the amount of 4-nitrophenol in the filtrate from that of the untreated solution. The amounts of $Fe^{3+}$, $Cu^{2+}$, $Co^{2+}$, $Ni^{2+}$, and $Cr^{3+}$ extracted by Polymer 6 were determined by subtracting the amounts in the filtrate from those in the untreated solution.

Example 43

Hybrid Polymer Characterization. The ratio of TEOS to the host component monomer was varied to produce two series of polymers defined in Table 7, designated 1 for the CD polymer and 2 for the CX polymer, as above. The as-synthesized products are unprimed and the solvent-extracted products (surfactant removed) are primed. Polymer 1a and its extraction product 1a' were prepared entirely from TEOS and thus contain no host molecule (CD or CX) (2a and 2a' would be redundant and are not listed). The amount of monomer was increased in the order 10, 25, 50, and 75%. Polymers were not prepared with 100% monomer (no TEOS), as they were expected to be sticky and to lack structural robustness.

Example 44

Figure 10:
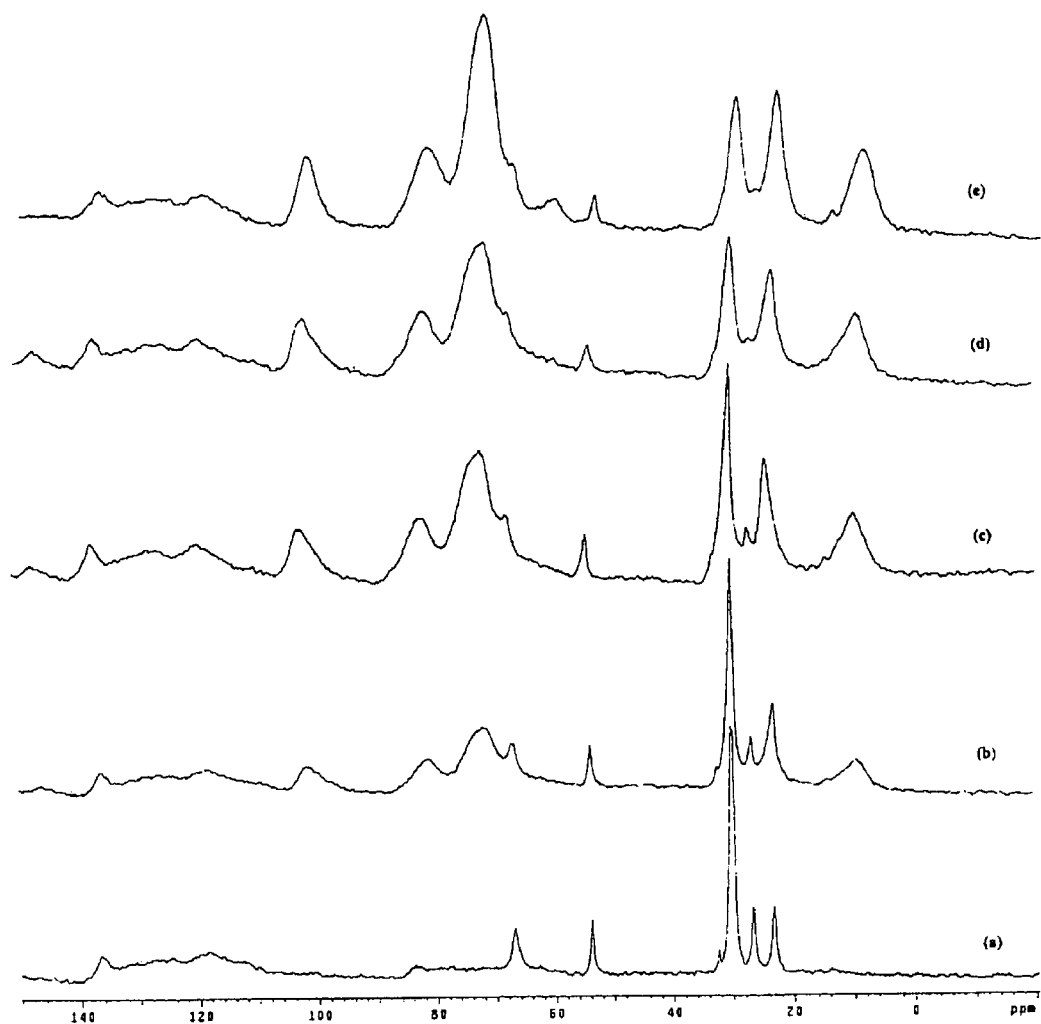
FIG. 10. $^{13}$C MAS NMR spectra of the as-synthesized CD-based polymers. (a) 1a, (b) 1b, (c) 1c, (d) 1d, and (e) 1e.

Solid State NMR Spectra. The product polymers were insoluble in solvents, so their structural characteristics were examined by solid state NMR with cross polarization and magic angle spinning. FIG. 10 contains the $^{13}$C spectra of the as-synthesized CD polymers 1b-1e, as well as the spectrum of polymer 1a from only TEOS. The six sharp peaks visible in the bottom spectrum of polymer 1a are from the surfactant CTAB. These peaks persist in the remaining spectra but broaden and weaken in intensity. The broad peaks in the region δ 110-140 are background from the rotor. As the proportion of CD builds from 1b to 1e by addition of Monomer 1, new peaks emerge that document the structural integrity of the sugar rings. The peak at about δ 100 is from the anomeric carbon C1, indicating that the glucose rings are intact. The other C—O carbons in the sugar rings and from the first carbon of the $OCH_2CH_2CH_2Si$ connector are found in the region δ 60-90. The other two carbons in the connector ($OCH_2CH_2CH_2Si$) are found at δ 9 and 23. Thus all peaks in the $^{13}$C spectrum are readily accounted for, and the polymerization process has in no way degraded the CD structure.

The solid state [29]Si spectra of 1a (pure TEOS with the surfactant) contains only Q peaks ($SiO_4$) at δ −100 and −110, in addition to the broad background peak from the rotor, centered at δ −52. These peaks decrease in intensity as Monomer 1 is added to the mix. The $T^2$ and $T^3$ peaks ($CSiO_3$) from the silicon atoms attached to the connector carbon in the polymerizing monomer grow in at δ −55 to −60 first as shoulders on the background peak and eventually as the major peaks. The T peaks document the integrity of the C—Si bond between the CD units and the polysilsesquioxane silicons.

FIG. 45

Figure 11:
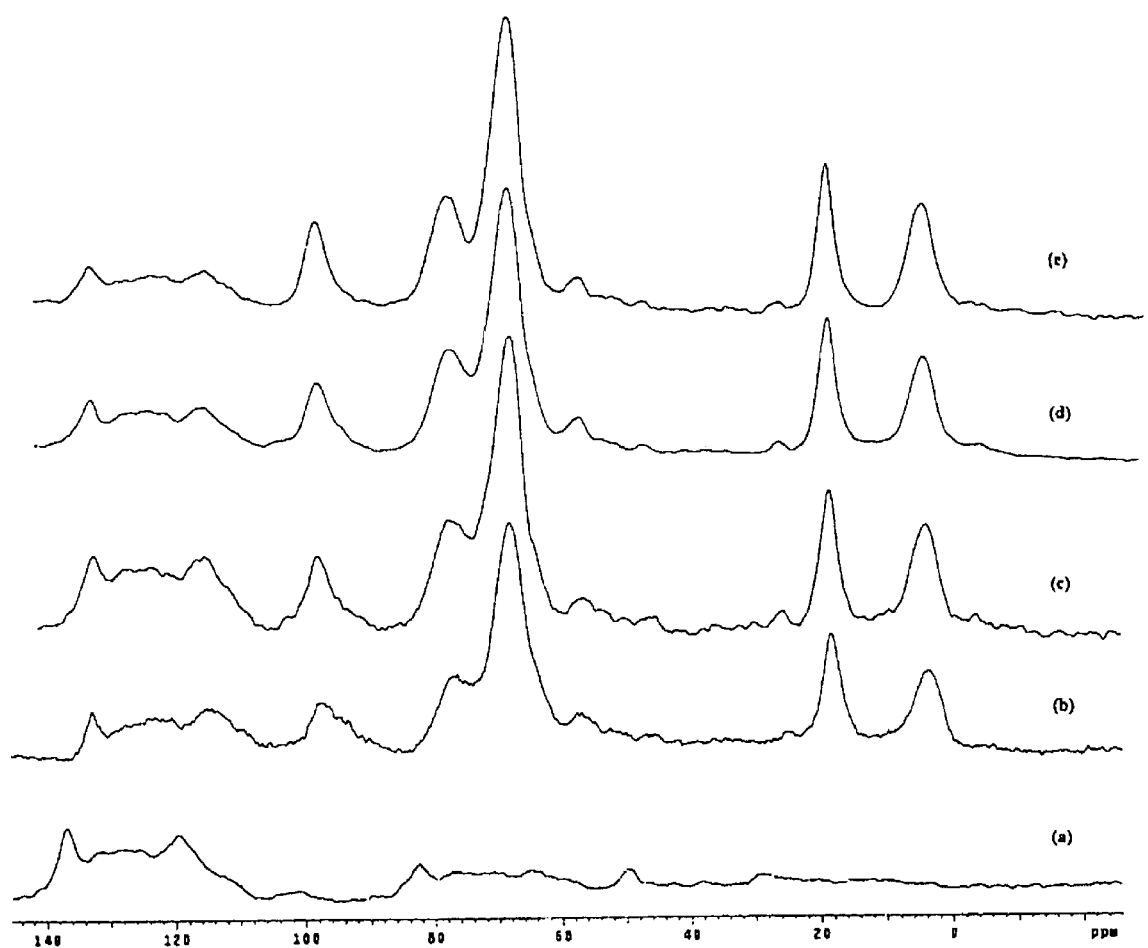
FIG. 11. $^{13}$C MAS NMR spectra of the surfactant-extracted CD-based polymers. (a) 1a', (b) 1b', (c) 1c', (d) 1d', and (e) 1e'.

FIG. 11 contains the solid state $^{13}$C spectra of the solvent-extracted CD polymers 1b'-1e', as well as the spectrum of the polymer 1a' from TEOS alone. The spectrum at the bottom of the TEOS polymer 1a' is pure silicate and lacks all carbon resonances except those from the background. Solvent extraction has effectively removed all of the surfactant. The CD resonances grow in from 1b to 1e and closely resemble those in FIG. 8. Thus solvent extraction had no effect on the integrity of the CD structure. The [29]Si spectra of the solvent-extracted polymers closely resemble those of the as-synthesized polymers 1.

Example 46

Figure 12:
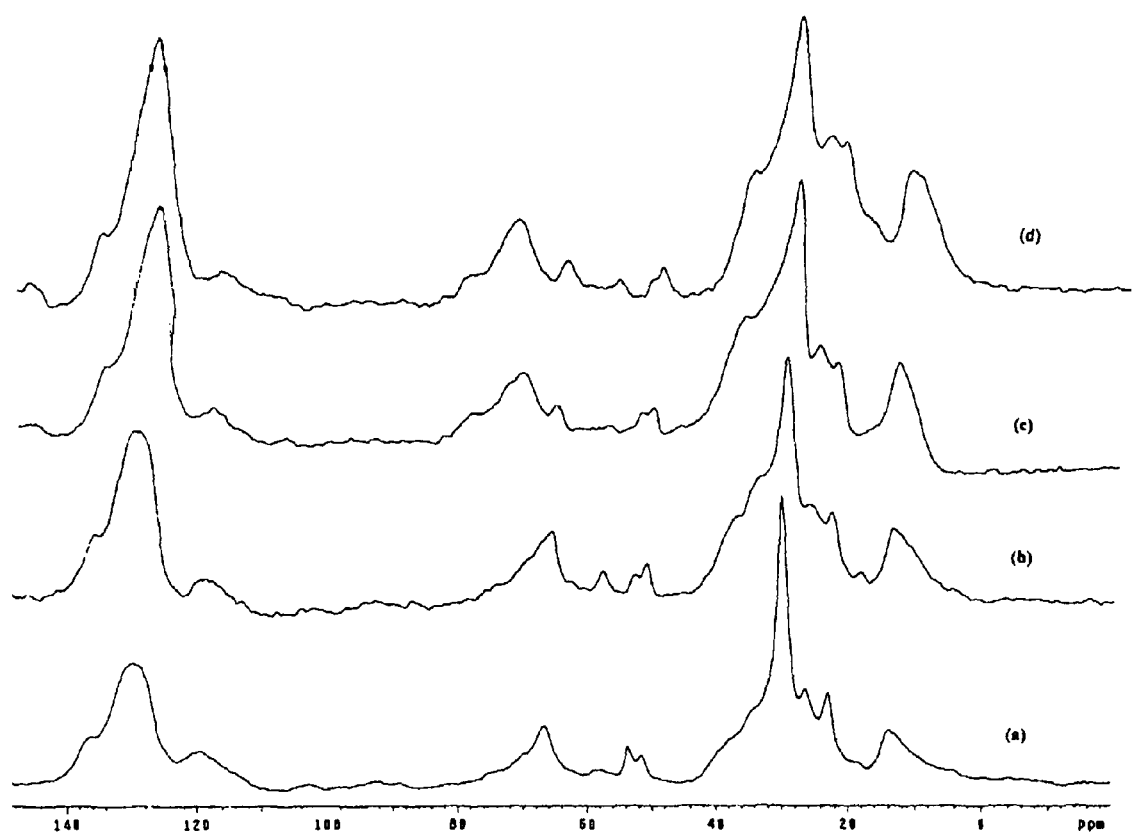
FIG. 12. $^{13}$C MAS NMR spectra of the as-synthesized CX-based polymers. (a) 2b, (b) 2c, (c) 2d, and (d) 2e.

FIG. 12 contains the solid state $^{13}$C spectra of the as-synthesized CX polymers 2. In this case, the spectrum from pure TEOS is omitted, as it would be the same as 1a in FIG. 10. The illustrated spectra show the decrease in intensity of the surfactant resonances at δ 23, 27, 30, 33, 54, and 67 and the growth of the CX resonances. The aromatic resonances are found in the region δ 110-140 (and bear no resemblance to the background resonances in this area seen in FIGS. 3 and 4). The resonances of the CX inter-ring methylene group and of the first methylene in the connector $ArCH_2CH_2CH_2Si$ are found at δ 20-40. The C—O para carbon resonance is found at δ 66. The other connector resonances ($ArCH_2CH_2CH_2Si$) appear at δ 14 and probably 23. Thus all major peaks are accounted for by the expected CX carbons. The solid state [29]Si spectrum contains decreasing Q peaks at δ −100 and −109 from the TEOS polymer (as the proportion of TEOS decreases) and increasing T peaks at δ −54 to −65 from the polysilsesquioxane polymer (as the Proportion of Monomer 3 increases), closely resembling the results from the CD polymer.

Example 47

Figure 13:
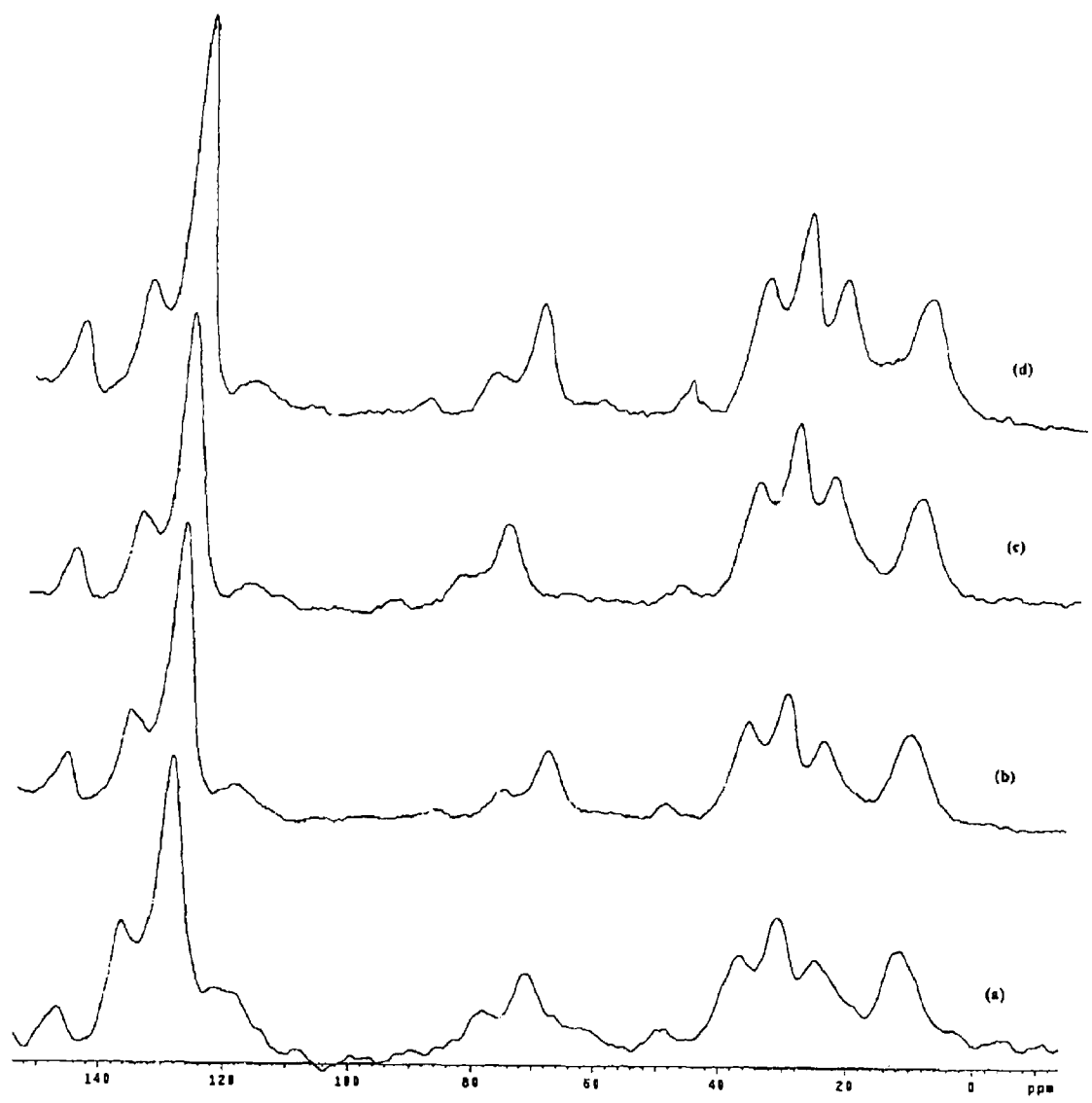
FIG. 13. $^{13}$C MAS NMR spectra of the surfactant-extracted CX-based polymers. From bottom to top: (a) 2b', (b) 2c', (c) 2d', and (d) 2e'.

FIG. 13 illustrates the solid state $^{13}$C spectra for the CX polymers after solvent extraction. The surfactant resonances disappear, and the CX resonances indicate no degradation of the calixarene structure. The solid state [29]Si spectra follow the same trend, with decreasing Q peaks and increasing T peaks as the proportion of Monomer 3 increases at the expense of TEOS. The presence of dominant T peaks confirms that the polysilsesquioxane structure is retained with intact Si—C bonds.

Example 48

Infrared Spectra. Fourier transform IR spectra were recorded for all 18 polymers. The dominant peak in all cases was the Si—O—Si stretch in 1050-1150 $cm^{-1}$, characteristic of siloxane condensation.

Example 49

Figure 14:
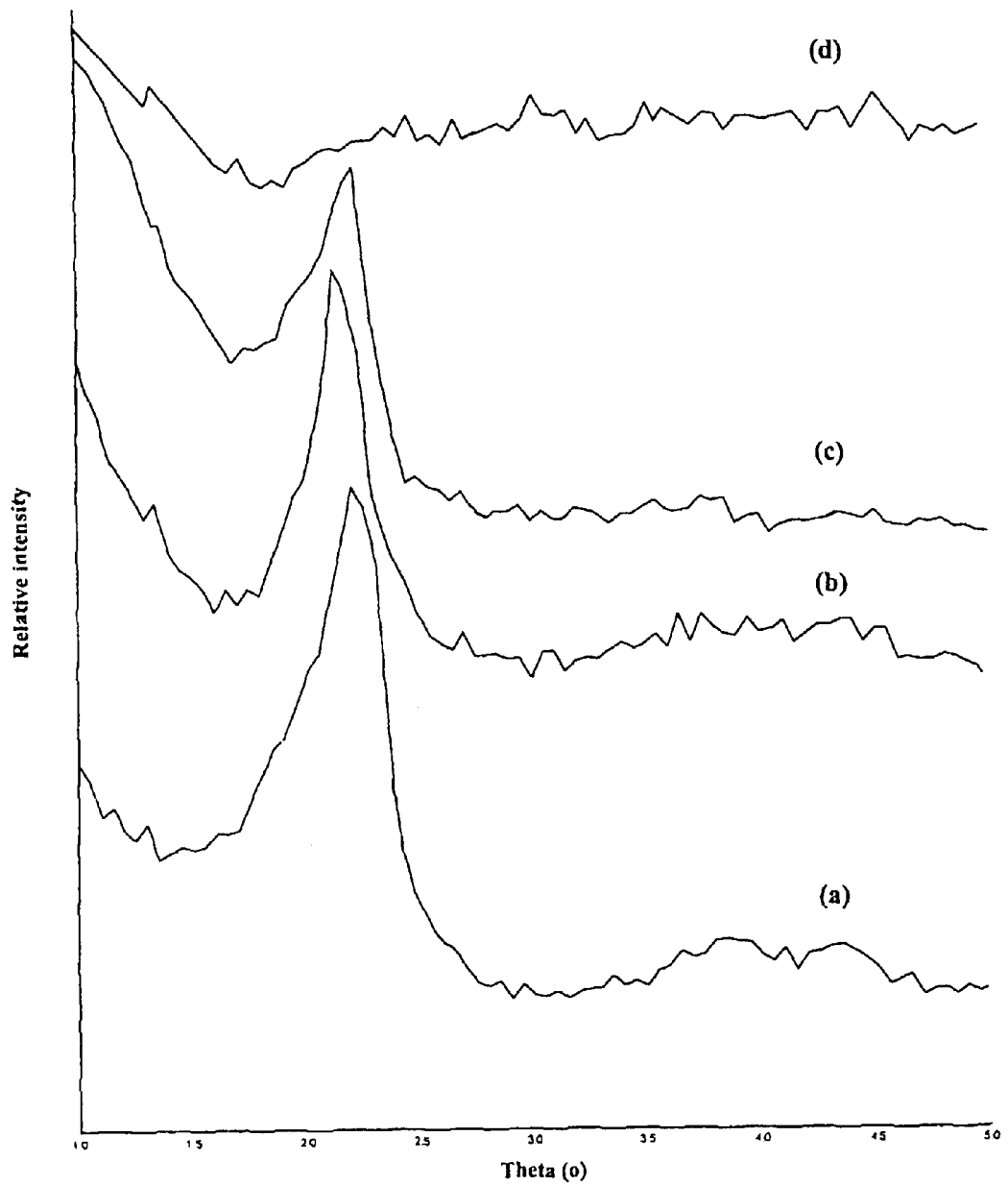
FIG. 14. Powder X-ray diffraction patterns of as-synthesized CD-based mesoporous samples containing different proportions of TEOS and CD-based Monomer 1. (a) 1b, (b) 1c, (c) 1d, (d) 1e.

Powder X-Ray Diffraction. Small angle XRD measurements on the polysilsesquioxanes obtained from Monomers 1 and 3 by sol-gel polymerization showed no ordering or periodicity. In contrast (FIG. 14), the as-synthesized templated polymers 1 from Monomer 1 containing CD units shows a single peak in the region 2θ≈2.2°, indicating values of $d_{100}$≈4.0 nm, which represents the distance from pore center to pore center. Table 8 gives the actual values in the second column. This order is lost as the proportion of TEOS decreases and that of Monomer 1 increases. As seen in FIG. 9, the peak at 2.2° decreases in intensity as the percentage of TEOS goes from 90% to 50% and is absent at 25%. Thus Polymer 1e remains amorphous, in agreement with our previous work on polysilsesquioxanes. It is the templated TEOS polymer that is believed to provide long range order. Cross linking in the polymer from Monomer 1 occurs extremely rapidly, as the monomer contains up to 42 hydrolyzable groups, compared with only four for TEOS. The templating role of the surfactant may be vitiated in the face of rapid condensation and cross linking of Monomer 1 alone.

After surfactant extraction from polymers 1 to produce polymers 1', a major peak in the powder XRD pattern remains at 2θ≈2.3°, indicating values of $d_{100}$≈3.9 nm (Table 8) for polymers with at least 50% TEOS (and the peak was weak at this level). There appears to be a slight contraction in the distance from pore center to pore center following surfactant removal. For the case of 1b', small peaks at 3.9 and 4.4° respectively correspond to $d_{100}$ and $d_{200}$, suggestive of longer range order. Similar observations were made with the CX polymers 2 and 2'. The presence of periodicity in the solid was indicated by a peak 2θ≈2.2° at higher levels of TEOS for the as-synthesized polymers 2, with values of $d_{100}$ contracting slightly on removal of the surfactant to form polymers 2' (Table 8, second column). As with the CD polymers, periodicity decreases or disappears when TEOS was under 50%.

Example 50a

Surface Area. The polymers we previously obtained from the sol-gel polymerization of Monomers 1 and 3 alone possessed very low surface areas. The Brunauer-Emmett-Teller (BET) values from nitrogen adsorption experiments were in the range 1.1-1.7 $m^2$ $g^{-1}$. For the present polymers, measurements were not made on the as-synthesized polymers, in which the surfactants presumably filled all voids. Table 8 gives the BET surface areas for the surfactant-extracted polymers in the third column. The value of 1080 $m^2$ $g^{-1}$ for polymer 1a', which corresponds to compound MCM-41 of the prior art, compares favorably to literature values and indicates high surface area. Both CD polymers and CX polymers 2' had BET values of 500-700 $m^2$ $g^{-1}$ when the percentage of TEOS was above 50% and values of 200-300 $m^2$ $g^{-1}$ when the percentage of TEOS dropped below 50%. Thus surface area decreases with higher percentages of Monomers 1 or 3, but are still two orders of magnitude higher than those of the polysilsesquioxanes produced in the absence of templation and extraction. The present method of processing clearly has led to polymers with much higher surface areas.

Example 50b

The mesopore diameters also were measured from the nitrogen adsorption experiments and were found to be in the narrow range of 2.4-3.2 nm (last column of Table 8). The distances must correspond to the diameter of the pores vacated by the surfactant, as they are much too large for the interior dimensions of CD or CX hosts.

Example 51

Figure 15:
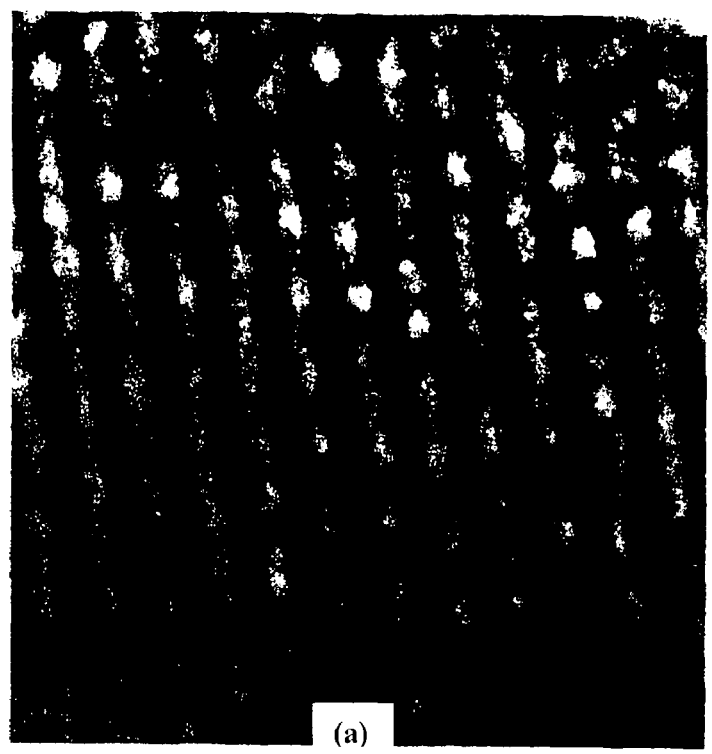
FIG. 15. TEM images of the well-ordered mesostructure of CD-based materials (a) as-synthesized 1c, and (b) after surfactant-extraction 1c.
Figure 15:

Electron Microscopy. Scanning electron microscopy (SEM) indicated that the materials consisted of coarse particles with diameters in the 10-100 μm range. High resolution transmission electron microscopy (TEM) images showed hexagonal arrangements of pores with uniform pore size throughout the sample. FIG. 15 provides the TEM images for the as-synthesized polymer 1c and its surfactant-extracted product 1c'. Thus the quality of the hexagonal mesostructure is retained as Monomer 1 or 3 is added and as the surfactant is extracted. The distances from pore center to pore center were measured to be 3.8-4.5 nm, corresponding very closely to the same distances calculated from powdered XRD (Table 8, column 2).

Example 52

Association Properties. Previous experiments with polysilsesquioxanes obtained by sol-gel polymerization demonstrated that the CD-based polymers had high affinity for small organic molecules in aqueous solution and the CX-based polymers had specific and modest affinity for iron and for some other cations in aqueous solution. The present association experiments were carried out to determine whether the ordering imposed by templation and the mesopores formed by solvent extraction enhance the binding abilities of the micropores provided by the covalently bound CD and CX structures.

Example 52A

Table 9 presents the percentage of 4-nitrophenol extracted from aqueous solution by polymer 1 under conditions comparable to those used above in association experiments with the sol-gel polymers containing covalently bound CD. Results are given for two loading levels, defined as the weight of the guest in grams divided by the weight of the host in grams converted to percentage. The as-synthesized polymers 1c and 1d removed 4-nitrophenol to below the detection limit of the UV assay (>99%) when the loading level was 0.2%. The percentage removed dropped into the 80s when there was over 75% TEOS and to 96% when there was only 25% TEOS for the as-synthesized polymers. The as-synthesized polymer MCM-41 (1a) without CD is reasonably effective in removing the organic (81%), but the presence of the organic host makes a polymer that is far superior in its ability to remove the organic from aqueous solution (>99% removal). The typical values for the sol-gel Polymer 1 under similar conditions were 89-94%. (See, Table 12) Thus polymerized TEOS, surfactant, polysilsesquioxane, and covalently bound CD work synergistically to provide the optimal result. The polymers are subject to saturation, as the percentage extraction falls at higher loading levels. The 57% removal of 4-nitrophenol by 1d compares with 25% by the sol-gel polymer under comparable conditions for a loading level of 5.0%. The new polymers thus perform better than the sol-gel polymers at higher loading level. Either the new polymer has more surface binding sites or the interior micropores are more accessible. The renewability of the as-synthesized polymers was tested by washing the polymers that had been charged with 4-nitrophenol with ethanol for 24 hours. The percentage of 4-nitrophenol that was released was 71% for polymer 1c, 75% for 1d, and 78% for 1e.

Example 52b

Similar experiments were carried out on the solvent-extracted CD-based polymers 1' (Table 10). Optimal results were obtained with polymer 1d' at 0.2% loading level: 92% removal of 4-nitrophenol. These results are comparable to those obtained with sol-gel polymerization without templation but slightly less than those obtained with the optimal as-synthesized polymers (1c and 1d). Results degrade significantly at higher loading levels (5%). Thus the as-synthesized polymers still containing the surfactant were uniformly more effective at removing 4-nitrophenol than the solvent-extracted polymers. Apparently the presence of the surfactant in polymers 1 has a slightly more positive effect on extraction of 4-nitrophenol than the presence of mesopores in polymers 1'. This cooperative effect of the surfactant may result from =noncovalent interactions with the substrate, higher levels of surface CD molecules, or destruction of surface CD by the washing process to remove the surfactant. Mesopores alone 1a' in the absence of the microporous CD molecules were the least effective (20%).

Example 52c

As shown above sol-gel polymers containing covalently bound CX molecules selectively removed $Fe^{3+}$ from aqueous solution. Polymer 3, containing only CX, removed 25-35% of this ion from aqueous solution under various conditions. Polymer 6, containing both CD and CX, also removed up to 35%. Most other ions ($Co^{2+}$, $Ni^{2+}$, $Cr^{3+}$, $Sr^{2+}$, $Ca^{2+}$, $Mg^{2+}$, $Na^+$) were not removed (<1%), whereas a few were removed to a small extent ($K^+$ 6-23%, $Cu^{2+}$ 3-6%, $Eu^{3+}$ 7-8%, $Ba^{2+}$ 2-3%).

Example 52d

These same ions were examined with the present polymers. Table 10 collects the results for three separate runs of metal extraction under conditions comparable to those used with the sol-gel polymers with CX. When $Fe^{3+}$ was the only cation present (Run 1), all the solvent-extracted polymers 2' were extremely effective at removing the cation from aqueous solution. Polymer 2c' with 75% TEOS was the best, removing a remarkable 67.8% of the metal ion. In Run 2, a collection of metal ions was present, and again all the solvent-extracted polymers were effective in removing $Fe^{3+}$ and other cations. Polymer 2c' in this case removed 34.2% of $Fe^{3+}$, 45.5% of $K^+$, 40.7% of $Cu^{2+}$, 9.4% of $Co^{2+}$, and 4.3% of $Cr^{3+}$. The polymers were ineffective in removing $Ni^{2+}$, in all formulations and $Cr^{3+}$ at most levels of TEOS. In Run 3, a different collection of metal ions yielded removal by 2c' of 4.8% of $Sr^{2+}$, 12.1% of $Ba^{2+}$, 18.9% of $Eu^{3+}$, and negligible amounts of $Na^+$, $Mg^{2+}$, or $Ca^{2+}$. The templated and solvent-extracted polymers thus are much more effective than the sol-gel polymers in removal of metal cations, presumably because of higher accessibility of the CX cavities. Optimal results were obtained when TEOS was present at the 75% level, but all four solvent-extracted polymers were quite effective. The results degraded at low (2b') or high (2e') levels of Monomer 3. Thus mesoporous polymers alone (CX) should be ineffective.

Example 52e

This higher degree of metal cation removal reveals interesting selectivities. The polymers selectively remove $K^+$ in the presence of $Na^+$ and (to a lesser degree) $Ba^{2+}$ over $Sr^{2+}$ over $Ca^{2+}$, suggesting a size dependence. All three tripositively charged cations ($Fe^{3+}$, $Cr^{3+}$, and $Eu^{3+}$) were removed to varying degrees. Chromium has been notoriously difficult to extract from aqueous solution.

Example 52F

The as-synthesized materials 2 showed extremely low abilities to bind metal cations (Table 11), in contrast to the abilities of as-synthesized 1 to bind 4-nitrophenol. The level of $Fe^{3+}$ extraction by 2 is much lower than with the sol-gel polymers. In the case of metal extraction, the mesopores in 2' appear to provide a role. The presence of the surfactant in polymers 2 is a deterrent to metal extraction, compared with the sol-gel polymers. After surfactant removal, the CX units of polymers 2' likely protrude into the mesopores, in contrast to the CD units of polymers 1'. In the presence of surfactant (2), metal cations may have a difficult time traveling to the CX units. After extraction (2'), the mesopores, although ineffective by themselves to trap the metal ions, provide ready access to the now exposed CX units. Metal cations in the aqueous medium of the mesopores would be more readily extracted by CX units protruding into the mesopores than metal cations in the external aqueous medium. Both the as-synthesized polymers 2 and the sol-gel Polymer 3 may possess a limited number of CX units available for metal complexation, since most CX units were structurally inside the polymer.

Example 53

Materials. As above, cycloheptaamylose (β-CD) was obtained from Aldrich Chemical Company, Inc., purified by recrystallization three times from $H_2O$, and dried at 110° C. for 12 h. Calix[4]arene was prepared according to literature procedures. Dimethylformamide (DMF), allyl bromide, and pyridine were freshly distilled prior to being used.

Characterization of materials. FTIR spectra were recorded on KBr pellets with an FTS60 spectrophotometer. Solution $^1$H and $^{13}$C NMR spectra were recorded on a Varian Mercury 400 spectrometer operating at 400.2 MHz [13]H and 100.6 MHz ($^{13}$C). Solution $^{29}$Si NMR spectra were recorded on a Varian Inova 400 spectrometer operating at 79.5 MHz. High resolution $^{13}$C and $^{29}$Si CP/MAS NMR spectra were run at 75.5 and 59.6 MHz, respectively, on a Varian VXR300 spectrometer with a $ZrO_2$ rotor and two aurum caps. The spinning speed ranged between 3 and 4 kHz. The experiments were carried out with high power $^1$H decoupling. Mass spectra were recorded on either a negative-ion mode JEOL DX-303 spectrometer or a Varian MAT 311 A EI instrument. The UV-vis spectra of aqueous buffered solutions of 4-nitrophenol (pH=11) were recorded at 25° C. with a Varian Cary 1E double beam spectrophotometer. The ICP-AES data for aqueous buffered solutions of metal cations were obtained with a Thermal Jarrell Ash Atomscan Model 25 Sequential Inductively Coupled Plasma Atomic Emission Spectrometer. The powder XRD patterns were obtained with a Rigaku DMAX-A diffractometer using Cu Kα radiation. The BET surface areas were determined by $N_2$ adsorption at liquid nitrogen temperature using a Micromeritics ASAP 2010 porosimeter. Samples were outgassed for 24 h at 100° C. SEM images were acquired using a Hitachi S4500-II scanning electron microscope with an acceleration voltage of 3 kV. TEM images were recorded on a Hitachi HI18100 200-kV transmission electron microscopy.

Example 54

Periodic Organosilicon Materials Containing CD (1). A typical synthetic procedure (FIG. 8) required a molar ratio of 1.00 silica source to 114$H_2O$ to 8.0 $NH_4OH$ (35 wt %) to 0.12 cetyltrimethylammonium bromide (CTAB). Tetraethoxysilane (TEOS) (Aldrich) and Monomer 1 were used as the silica sources. Samples were prepared with TEOS to Monomer 1 in Si mole ratios of 1/0 (1a), 0.9/0.1 (1b), 0.75/0.25 (1c), 0.50/0.50 (1d), and 0.25/0.75 (1e). CTAB (0.84 g, 2.3 mmol) was added to a solution of $NH_4OH$ (17.72 g, 30 wt %, 0.15 mol) and deionized water (33.4 g, 1.86 mol), and the solution was stirred for 30 min in a closed flask. A mixture of TEOS and Monomer 1 corresponding to the appropriate mole fraction, with a total of 19.2 mmol of Si [for example, 3.0 g (14.4 mmol) of TEOS and 1.47 g (4.8 mmol) of Monomer 1 for sample 1c], was added slowly to the base/surfactant solution with gentle stirring. After further stirring for 30 min, the solutions were aged at 80° C. for 4 days in a closed flask. The white solid was collected by filtration, washed thoroughly with water, and air-dried under ambient conditions. A typical yield was 3.15 g for 1d.

Example 55

Periodic Organosilicon Materials Containing CX (2). A typical synthetic procedure (FIG. 9) required a mole ratio of 1.00 silica source to 114 $H_2O$ to 8.0 $NH_4OH$ (35 wt %) to 0.12 CTAB. TEOS (Aldrich) and CX-based Monomer 2 were used as the silica sources. Samples were prepared with TEOS to Monomer 3 in Si mole ratios of 0.9/0.1 (2b), 0.75/0.25 (2c), 0.50/0.50 (2d), and 0.25/0.75 (2e). CTAB (0.84 g, 2.3 mmol) was added to a solution of $NH_4OH$ (17.72 g, 30 wt %, 0.15 mol) and deionized water (33.4 g, 1.86 mol), and the solution was stirred for 30 min in a closed flask. A mixture of TEOS and Monomer 3 corresponding to the appropriate mole fraction, with a total of 19.2 mmol Si [for example, 3.0 g (14.4 mmol) of TEOS and 1.49 g (4.8 mmol) of Monomer 1 for sample 2c], was added slowly to the base/surfactant solution with gentle stirring. After further stirring for 30 min, the solutions were aged at 80° C. for 4 days in a closed flask. The white solid was collected by filtration, washed thoroughly with water, and air-dried under ambient conditions. A typical yield was 2.819 for 2d.

Example 56

Surfactant Removal. Solvent extraction of surfactant was carried out as known in the art by the procedure of Stein et al. to produce polymers 1' and 2'. An as-synthesized sample (1.5 g) was stirred for 48 h in a refluxing solution of 30 g of HCl (36 wt %) and 210 g of $CH_3OH$.

Example 57

Extraction of 4-Nitrophenol by As-synthesized CD-based Polymer (1b). The as-synthesized CD-based polymer (1b, 265 mg) was stirred with 50 mL of aqueous solution containing 4-nitrophenol ($8.63 \times 10^{-5}$M) at 25° C. for 18 h. The suspension was filtered, and the residual 4-nitrophenol concentration in the filtrate was measured by UV-vis spectroscopy. The amount of 4-nitrophenol extracted by polymer 1b was then determined by subtracting the concentration of 4-nitrophenol in the filtrate from that of the untreated 4-nitrophenol solution. The same procedure was used for extraction of 4-nitrophenol by other as-synthesized polymers 1 and by the solvent-extracted polymers 1'.

Example 58

Regeneration of the As-synthesized CD-based Polymer 1c Loaded with 4-Nitrophenol. CD-based polymer 1c (200 mg) loaded with a known amount of 4-nitrophenol was stirred in 30 mL of pure ethanol at 25° C. for 24 h. The suspension was filtered, and the concentration of 4-nitrophenol in the ethanol filtrate was measured by UV-vis spectroscopy. The amount of 4-nitrophenol removed from polymer 1C then was determined by difference.

Example 59

Removal of Metal Cations by Solvent-extracted CX-based Polymer (2b'). The CX-based polymer 2b' (100 mg) was stirred with 50 mL of aqueous solution containing $Fe^{3+}$, $Cu^{2+}$, $Co^{2+}$, and $Cr^{3+}$ ($1.0 \times 10^{-4}$M for each metal cation) at 25° C. for 18 h. The suspension was filtered, and the residual metal cation concentrations in the filtrate were measured by ICP-AE spectroscopy. The amounts of ions extracted by polymer 2b' then were determined by subtracting the amounts in the filtrate from those of the untreated metal cation solution. The same procedure was used for extraction of metal cations by the other solvent-extracted polymers 2' and the as-synthesized polymers 2.

TABLE 1

Gelation Times for the Sol-gel Polymerization of CD- and CX-based Silane Monomers to Nanoporous Polysilsesquioxanes

| monomer | monomer concentration (M) | amount of $H_2O$ (eq. monomer)[a] | gelation time (min) |
|---|---|---|---|
| 1 | 0.13 | 3n | 1 |
| 2 | 0.13 | 3n | <1 |
| 3 | 0.13 | 12 | No gel |
| 3 | 0.5 | 12 | 7 |
| 4 | 0.2 | 24 | 120 |
| 5 | 0.2 | 24 | 37 |
| 1 + 3 | 0.2 | 3n +12 | 3 |
| 2 + 5 | 0.2 | 3n +24 | 2 |
| $CH_3SiCl_3$ | 1.0 | 3 | No gel |
| $Si(OCH_3)_4$ | 1.0 | 4 | No gel |
| $CH_3SiCl_3$ | >5.0 | 3 | No gel |
| $Si(OCH_3)_4$ | >5.0 | 4 | No gel |

[a]n represents the extent of hydrosilylation in Schemes 1, 3, and 5.

TABLE 2

Percentage Extraction of Metal Cations in Water[a]

| metal cation | polymer 4 | polymer 3 | polymer 5 | polymer 6 | polymer 7 |
|---|---|---|---|---|---|
| $Fe^{3+}$ | <1.0 | 24.8 | 26.2 | 35.2 | 33.8 |
| $K^+$ | <1.0 | 6.5 | 6.9 | 7.9 | 7.2 |
| $Cu^{2+}$ | <1.0 | 3.4 | 3.2 | 4.2 | 3.5 |
| $Co^{2+}$ | <1.0 | <1.0 | <1.0 | <1.0 | <1.0 |
| $Ni^{2+}$ | <1.0 | <1.0 | <1.0 | <1.0 | <1.0 |
| $Cr^{3+}$ | <1.0 | <1.0 | <1.0 | <1.0 | <1.0 |

[a]Aqueous phase [metal nitrate = $1.0 \times 10^{-4}$ M]; reaction time, 18 h; reaction temperature, 25° C.

TABLE 3

Percentage Extraction of Metal Cations in Water[a]

| metal cation | polymer 4 | polymer 3 | polymer 5 | polymer 6 | polymer 7 |
|---|---|---|---|---|---|
| $Fe^{3+}$ | <1.0 | 20.4 | 20.7 | 23.5 | 22.9 |
| $K^+$ | <1.0 | 11.1 | 13.4 | 23.3 | 16.4 |
| $Cu^{2+}$ | <1.0 | 5.2 | 5.3 | 5.9 | 5.7 |
| $Co^{2+}$ | <1.0 | <1.0 | <1.0 | <1.0 | <1.0 |
| $Ni^{2+}$ | <1.0 | <1.0 | <1.0 | <1.0 | <1.0 |
| $Cr^{3+}$ | <1.0 | <1.0 | <1.0 | <1.0 | <1.0 |

[a]Aqueous phase [Metal nitrate = $1.0 \times 10^{-3}$ M]; reaction time, 18 h; reaction temperature, 25° C.

TABLE 4

Percentage Extraction of Metal Cations in Water[a]

| metal cation | polymer 3 | polymer 4 | polymer 6 |
|---|---|---|---|
| $Eu^{3+}$ | 6.9 | <1.0 | 8.3 |
| $Ba^{2+}$ | 3.3 | <1.0 | 2.3 |
| $Sr^{2+}$ | <1.0 | <1.0 | <1.0 |
| $Ca^{2+}$ | <1.0 | <1.0 | <1.0 |
| $Mg^{2+}$ | <1.0 | <1.0 | <1.0 |
| $Na^+$ | <1.0 | <1.0 | <1.0 |

[a]Aqueous phase [metal nitrate = $1.0 \times 10^{-3}$ M]; reaction time, 18 h; reaction temperature, 25° C.

TABLE 5

Effect of pH on the Percentage Extraction of Metal Cations in Water[a]

| | metal cations extracted (%) | | | | |
|---|---|---|---|---|---|
| polymer | $Fe^{3+}$ | $Cu^{2+}$ | $Co^{2+}$ | $Cr^{3+}$ | pH |
| 3 | 2.1 | 1.3 | <1.0 | <1.0 | 2 |
| 3 | 11.2 | 2.1 | <1.0 | <1.0 | 3 |
| 3 | 28.1 | 3.4 | <1.0 | <1.0 | 4 |
| 3 | 34.8 | 5.2 | <1.0 | <1.0 | 5 |
| 6 | 4.0 | 1.6 | <1.0 | <1.0 | 2 |
| 6 | 22.4 | 3.2 | <1.0 | <1.0 | 3 |
| 6 | 35.8 | 4.1 | <1.0 | <1.0 | 4 |
| 6 | 40.4 | 6.3 | <1.0 | <1.0 | 5 |

[a]Aqueous phase [metal nitrate = $1.0 \times 10^{-4}$ M]; reaction time, 18 h; reaction temperature, 25° C.

TABLE 6

Percentage Absorption of Metal Cations and 4-Nitrophenol in Water[a]

| solute | polymer 6 | polymer 7 |
|---|---|---|
| 4-nitrophenol | 90 | 86 |
| $Fe^{3+}$ | 33.3 | 30.9 |
| $Cu^{2+}$ | 4.8 | 2.3 |
| $Co^{2+}$ | <1.0 | <1.0 |
| $Ni^{2+}$ | <1.0 | <1.0 |
| $Cr^{3+}$ | <1.0 | <1.0 |

[a]Aqueous phase [metal nitrate = $1.0 \times 10^{-4}$ M, 4-nitrophenol = $8.63 \times 10^{-5}$ M]; reaction time, 18 h; reaction temperature, 25° C.

TABLE 7

Polymer Products

| Host | Designation[a] | % TEOS | % monomer |
|---|---|---|---|
| — | 1a | 100 | 0 |
| CD | 1b | 90 | 10 |
| CD | 1c | 75 | 25 |
| CD | 1d | 50 | 50 |
| CD | 1e | 25 | 75 |
| — | 1a' | 100 | 0 |
| CD | 1b' | 90 | 10 |
| CD | 1c' | 75 | 25 |
| CD | 1d' | 50 | 50 |
| CD | 1e' | 25 | 75 |
| CX | 2b | 90 | 10 |
| CX | 2c | 75 | 25 |
| CX | 2d | 50 | 50 |
| CX | 2e | 25 | 75 |
| CX | 2b' | 90 | 10 |
| CX | 2c' | 75 | 25 |
| CX | 2d' | 50 | 50 |
| CX | 2e' | 25 | 25 |

[a]Unprimed materials are as synthesized. Primed materials are solvent extracted to remove the surfactant.

TABLE 8

Physical and Surface Properties of CD-based and CX-based Materials

| Material | XRD d-spacing (100) (nm) | BET surface area ($m^2 g^{-1}$) | Mesopore diameter (nm) |
|---|---|---|---|
| 1a | 4.02 | — | — |
| 1a' | 3.97 | 1080 | 3.0 |
| 1b | 4.01 | — | — |
| 1b' | 3.85 | 670 | 2.9 |
| 1c | 4.08 | — | — |
| 1c' | 3.77 | 560 | 2.9 |

TABLE 8-continued

Physical and Surface Properties of CD-based and CX-based Materials

| Material | XRD d-spacing (100) (nm) | BET surface area ($m^2 g^{-1}$) | Mesopore diameter (nm) |
|---|---|---|---|
| 1d | 3.95 | — | — |
| 1d' | — | 250 | 2.9-3.9 |
| 1e | — | — | — |
| 1e' | — | 190 | 3.9 |
| 2b | 4.06 | — | — |
| 2b' | 3.93 | 650 | 2.4 |
| 2c | 3.89 | — | — |
| 2c' | 3.77 | 570 | 2.4 |
| 2d | 3.92 | — | — |
| 2d' | — | 260 | 2.5 |
| 2e | — | — | — |
| 2e' | — | 210 | 2.7 |

TABLE 9

Extraction Percentages of 4-Nitrophenol from Aqueous Solution[a]

| Polymer | Loading level (wt %) | % absorbed |
|---|---|---|
| 1a | 0.2 | 81 |
| | 5.0 | 32 |
| 1b | 0.2 | 84 |
| | 5.0 | 39 |
| 1c | 0.2 | >99 |
| | 5.0 | 49 |
| 1d | 0.2 | >99 |
| | 5.0 | 57 |
| 1e | 0.2 | 96 |
| | 5.0 | 41 |
| 1a' | 0.2 | 20 |
| | 5.0 | 1 |
| 1b' | 0.2 | 41 |
| | 5.0 | 5 |
| 1c' | 0.2 | 60 |
| | 5.0 | 10 |
| 1d' | 0.2 | 92 |
| | 5.0 | 17 |
| 1e' | 0.2 | 86 |
| | 5.0 | 12 |

[a]Reaction time 18 h, concentration of 4-nitrophenol $8.63 \times 10^{-5}$ M.

TABLE 10

Extraction Percentages of Metal Cations by Solvent-Extracted Polymers from Aqueous Solution[a]

| Cation | 2b' | 2c' | 2d' | 2e' |
|---|---|---|---|---|
| $Fe^{3+b}$ | 47.0 | 67.8 | 54.1 | 27.8 |
| $Fe^{3+c}$ | 33.2 | 34.2 | 29.7 | 27.0 |
| $K^{+c}$ | 5.5 | 45.5 | 28.3 | 8.2 |
| $Cu^{2+c}$ | 6.8 | 40.7 | 8.2 | 3.2 |
| $Co^{2+c}$ | 2.1 | 9.4 | 3.6 | 2.1 |
| $Ni^{2+c}$ | <1.0 | 1.4 | <1.9 | <1.0 |
| $Cr^{3+c}$ | <1.0 | 4.3 | <1.0 | <1.0 |
| $Na^{+d}$ | <1.0 | <1.0 | <1.0 | <1.0 |
| $Mg^{2+d}$ | <1.0 | <1.0 | <1.0 | <1.0 |
| $Ca^{2+d}$ | <1.0 | <1.0 | <1.0 | <1.0 |
| $Sr^{2+d}$ | <1.0 | 4.8 | 4.5 | 3.6 |
| $Bn^{2+d}$ | <1.0 | 12.1 | 9.0 | 2.4 |
| $Eu^{3+d}$ | <1.0 | 18.9 | 11.3 | 8.9 |

[a]Concentration of individual metal ions $1.0 \times 10^{-4}$ M, 18 h, 25° C., 0.13 g of polymer in 50 g of aqueous solution.
[b]Run 1.
[c]Run 2.
[d]Run 3.

TABLE 11

Extraction Percentages of Metal Cations by As-Synthesized Polymers from Aqueous Solution.[a]

| Cation | 2b | 2c | 2d | 2e |
|---|---|---|---|---|
| $Fe^{3+}$ | 5.4 | 8.7 | 4.6 | 3.4 |
| $K^{-1}$ | <1.0 | 3.2 | <1.0 | <1.0 |
| $Cu^{2+}$ | 1.4 | 2.1 | 1.3 | <1.0 |
| $Co^{2+}$ | <1.0 | <1.0 | <1.0 | <1.0 |
| $Ni^{2+}$ | <1.0 | <1.0 | <1.0 | <1.0 |
| $Cr^{3+}$ | <1.0 | <1.0 | <1.0 | <1.0 |

[a]Concentration of metal ions $1.0 \times 10^{-4}$ M, 18 h, 25° C., 0.13 g of polymer in 50 g of aqueous solution.

TABLE 12

Extraction Abilities of Various Polymers.

| | % 4-nitrophenol | % $Fe^{3+}$ | % $K^+$ | % $Cu^{2+}$ |
|---|---|---|---|---|
| MCM-41 (1a) | 81 | | | |
| 1d | >99 | | | |
| 1d' | 92 | | | |
| Polymer 1 (sol-gel) | 89 | | | |
| Activated charcoal | 83 | | | |
| Polyurethane CD | 30 | | | |
| Polymethyl-silsesquioxane | 7 | | | |
| Polysilicate | 2 | | | |
| 2c | | 8.7 | 3.2 | 2.1 |
| 2c' | | 67.8 | 45.5 | 40.7 |
| Polymer 3 | | 24.8 | 6.5 | 3.4 |

We claim:

1. A calixarene compound comprising at least one aryl unit comprising a hydrolyzable silyl group pendant therefrom, said pendancy meta to a methylene moiety of said calixarene.

2. The compound of claim 1 wherein a said aryl unit has a silyl group ortho and meta to said methylene moiety.

3. The compound of claim 1 wherein said silyl group is substituted with a moiety selected from halide and alkoxy.

4. The compound of claim 1 comprising a tetrameric calixarene wherein each said aryl unit has a silyl group ortho and meta to said methylene moiety.

5. The compound of claim 1 coupled to a second calixarene compound with an O—Si—O bond sequence, and each said aryl unit comprises a silyl group meta to a methylene moiety thereof.

6. The compound of claim 5 coupled to a second said calixarene compound with a siloxane bond sequence.

7. The compound of claim 1 coupled to a second said calixarene compound with a siloxane bond sequence.

8. The compound of claim 1 comprising a hydroxy group ortho to said methylene moiety.

9. The compound of claim 8 coupled to a second said calixarene compound with a siloxane bond sequence.

10. The compound of claim 2 coupled to a second said calixarene compound with a siloxane bond sequence.

* * * * *